W. DEATS.
COIL MAKING MACHINE.
APPLICATION FILED MAY 1, 1912.
1,190,868.
Patented July 11, 1916.
21 SHEETS—SHEET 5.
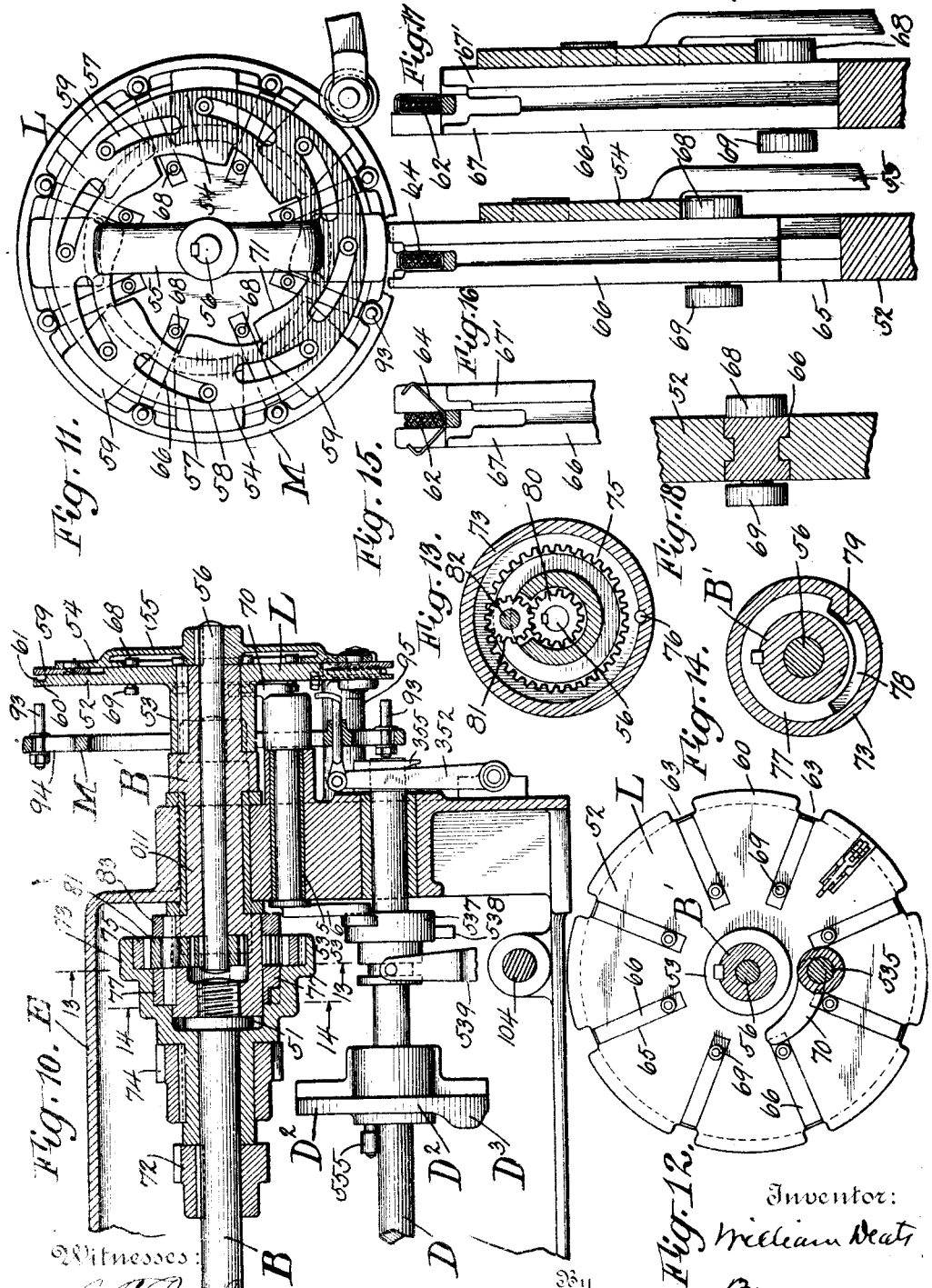
Inventor:
William Deats
By
L. W. Cumpsten
Attorney
Witnesses
J. F. Rule
James G. Bethell.

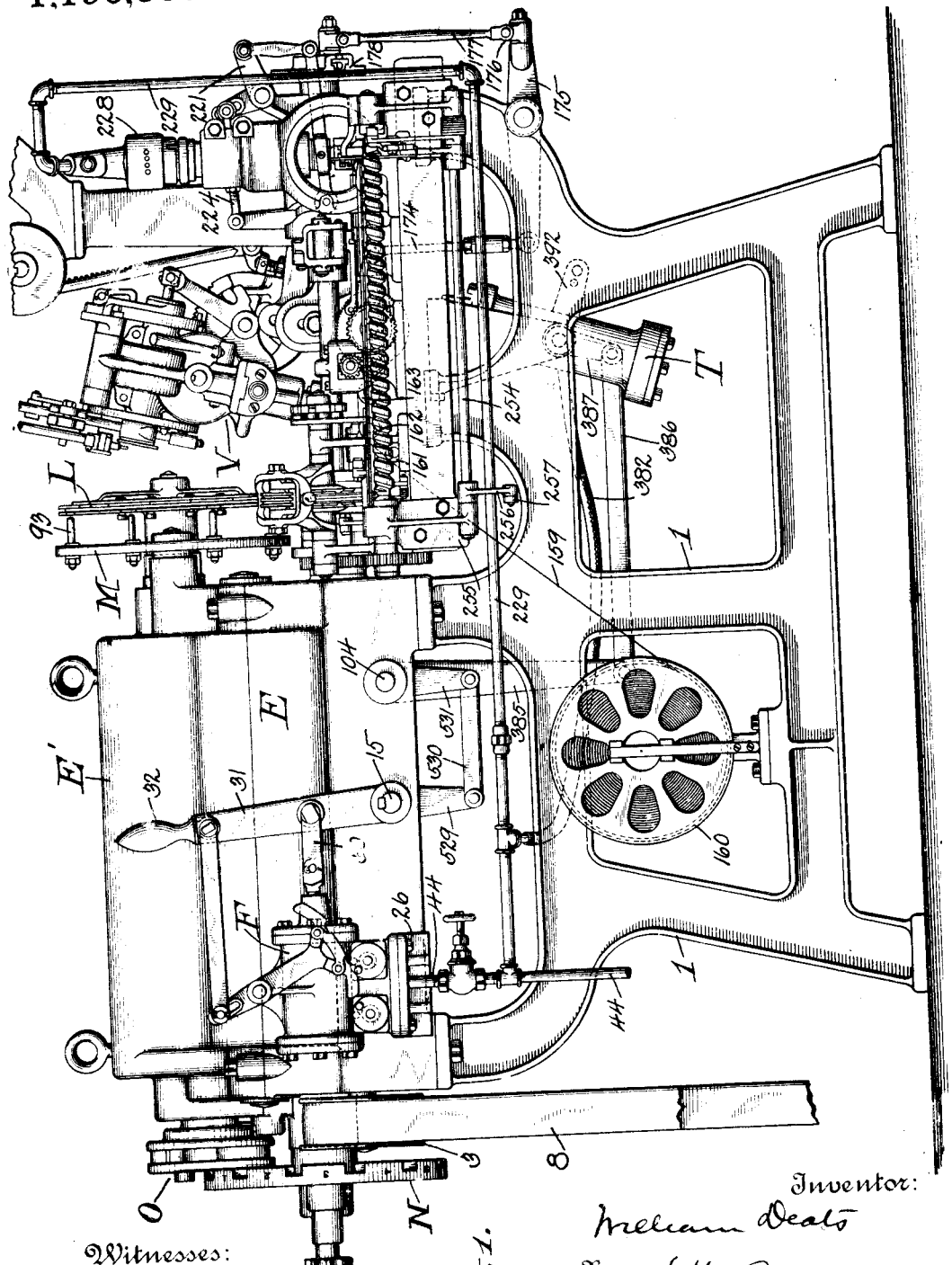

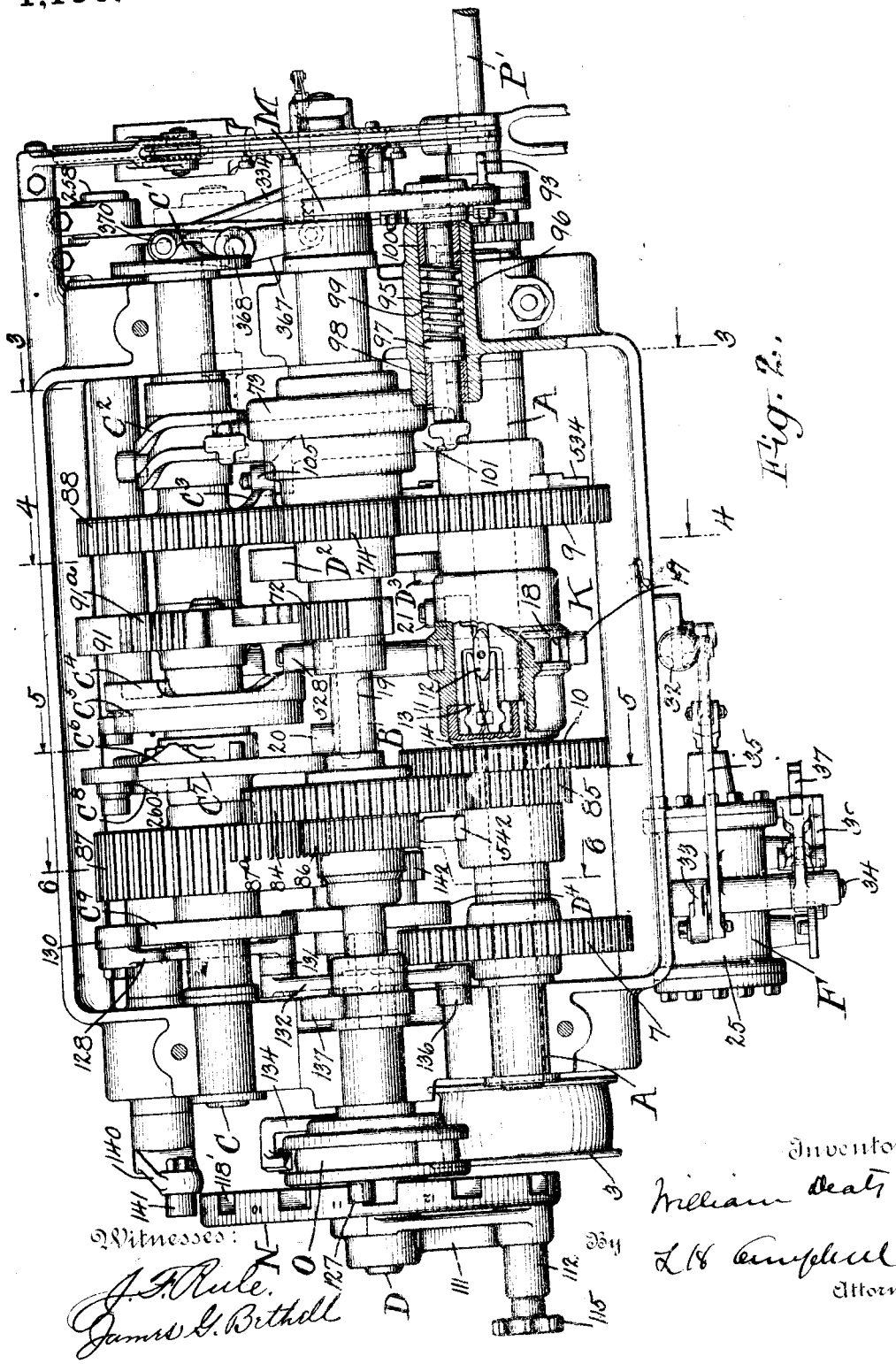

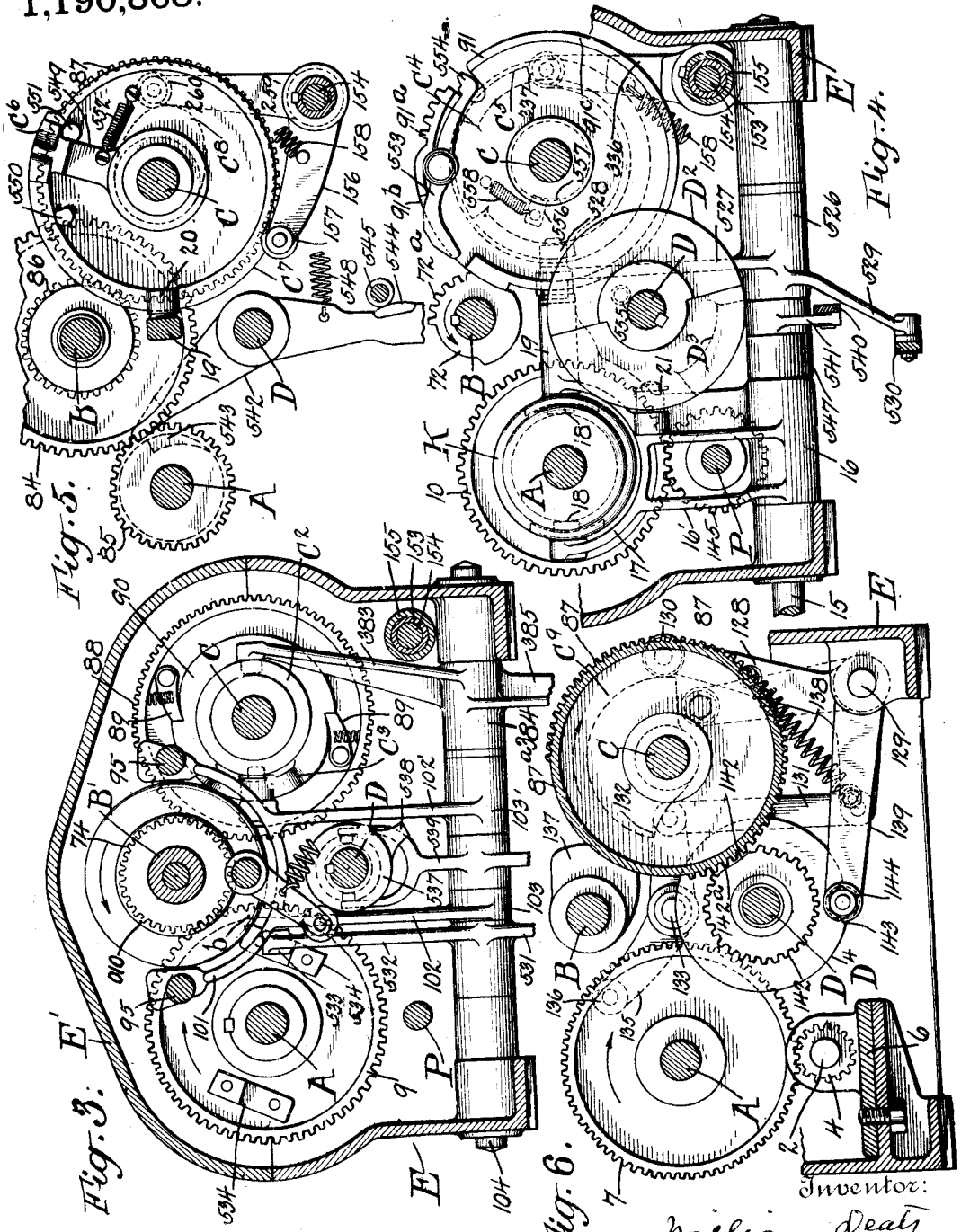

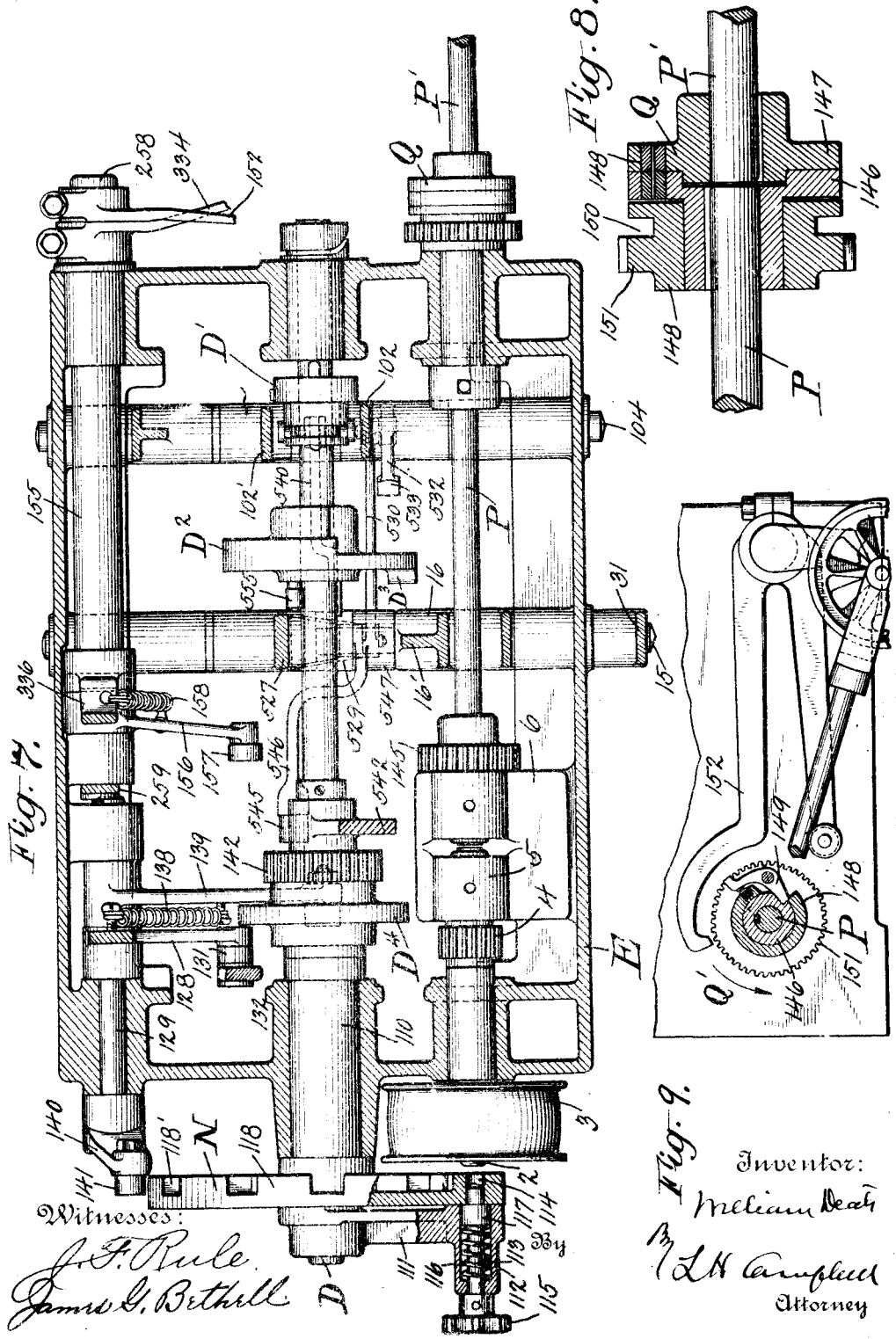

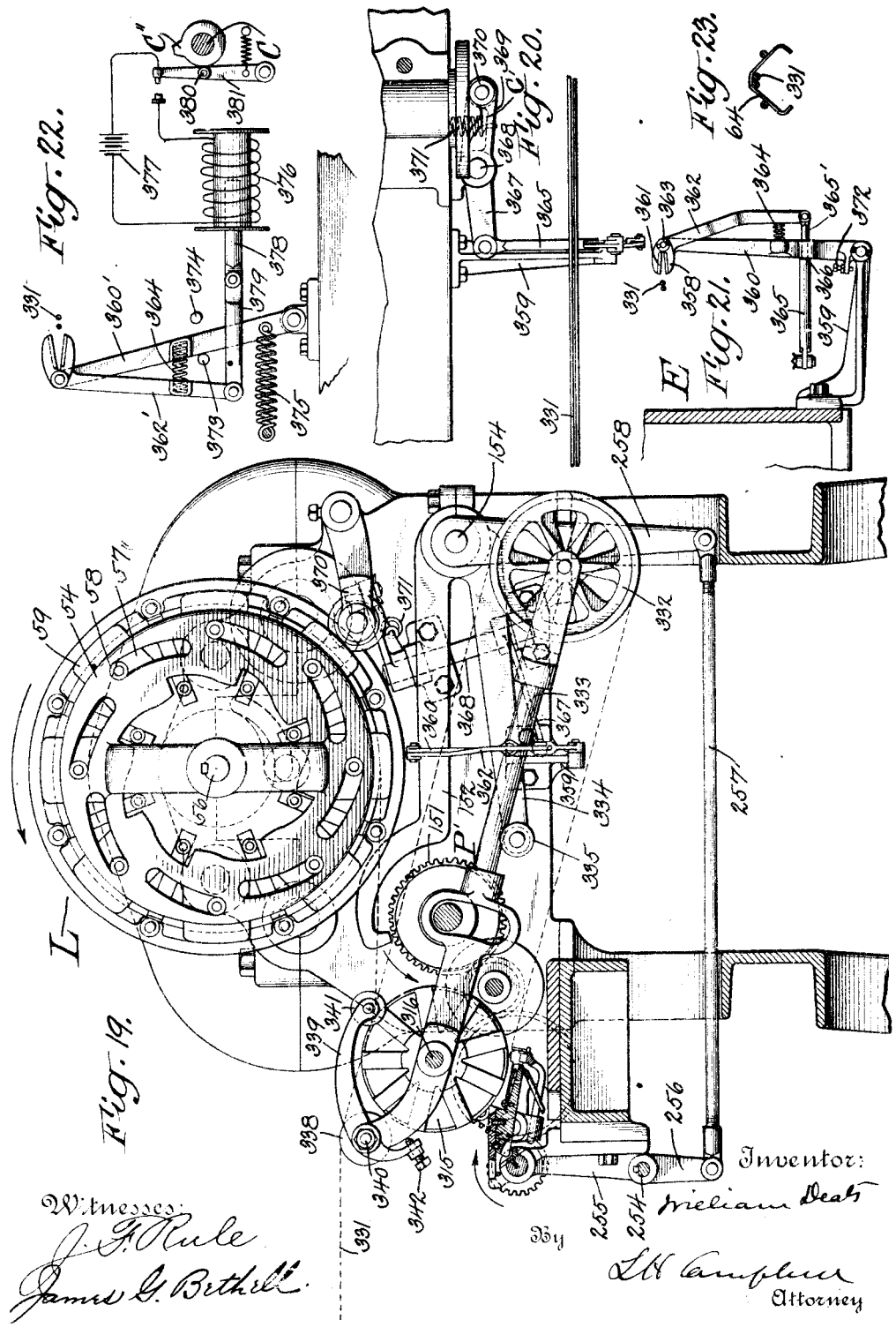

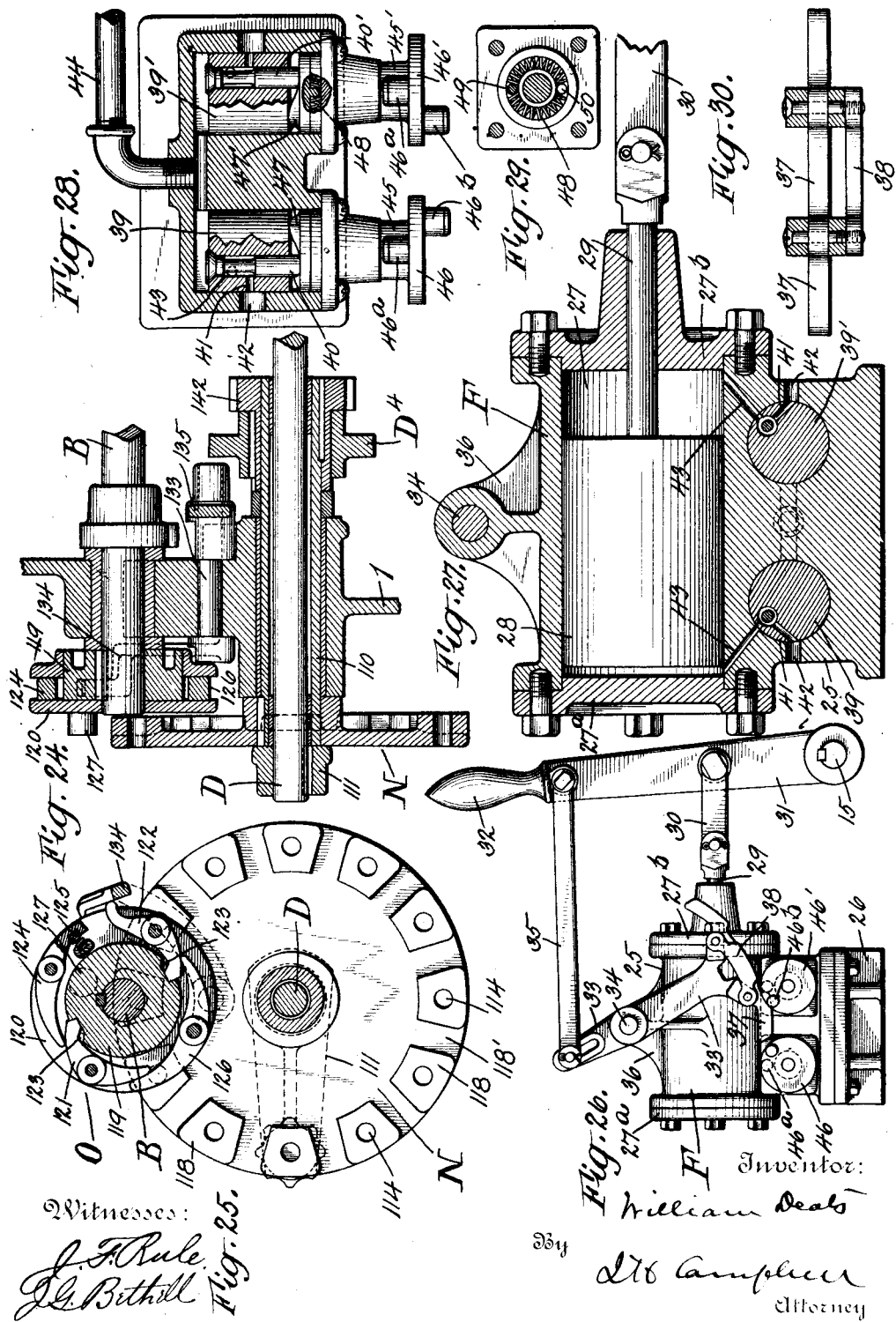

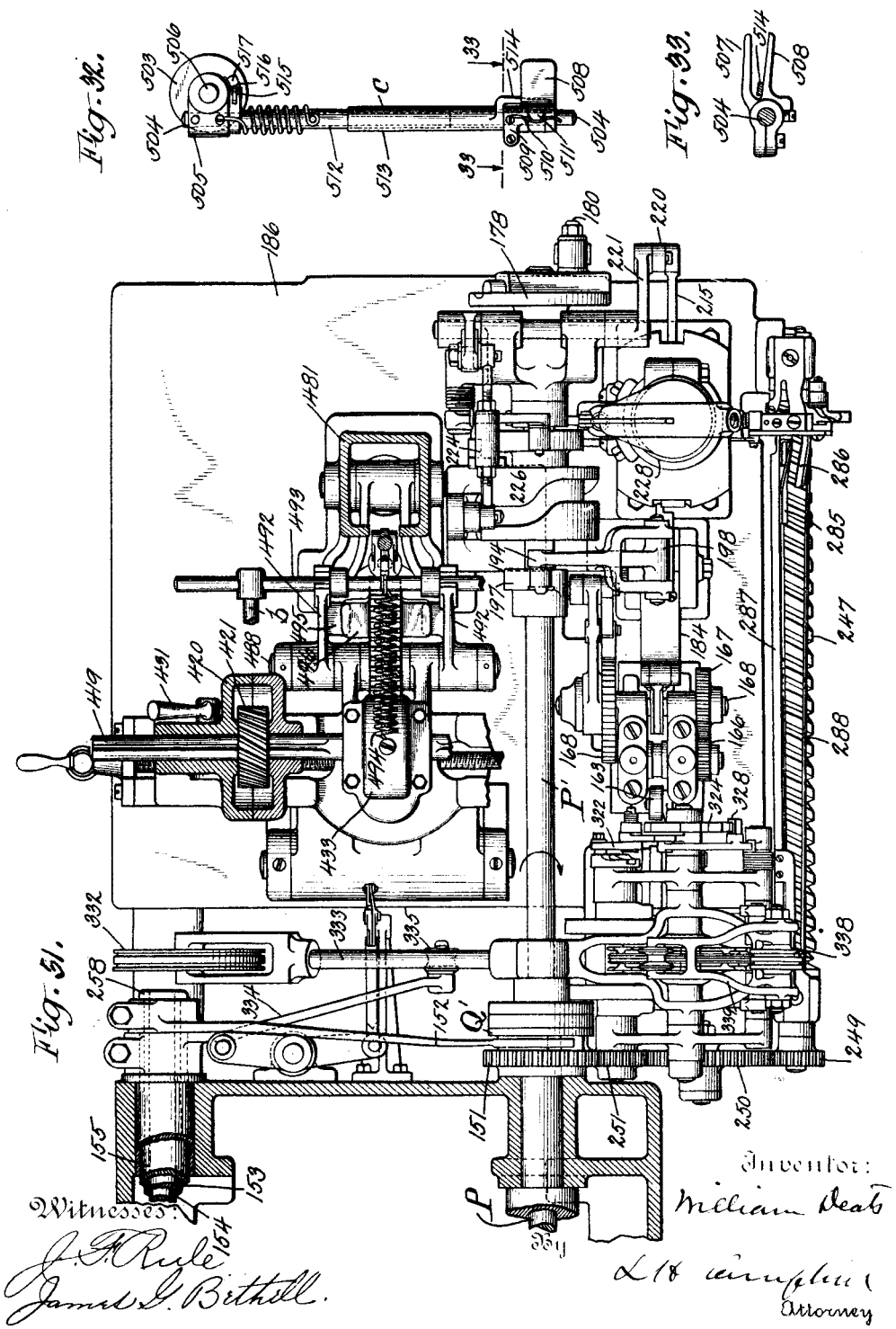

W. DEATS.
COIL MAKING MACHINE.
APPLICATION FILED MAY 1, 1912.
1,190,868.
Patented July 11, 1916.
21 SHEETS—SHEET 9.
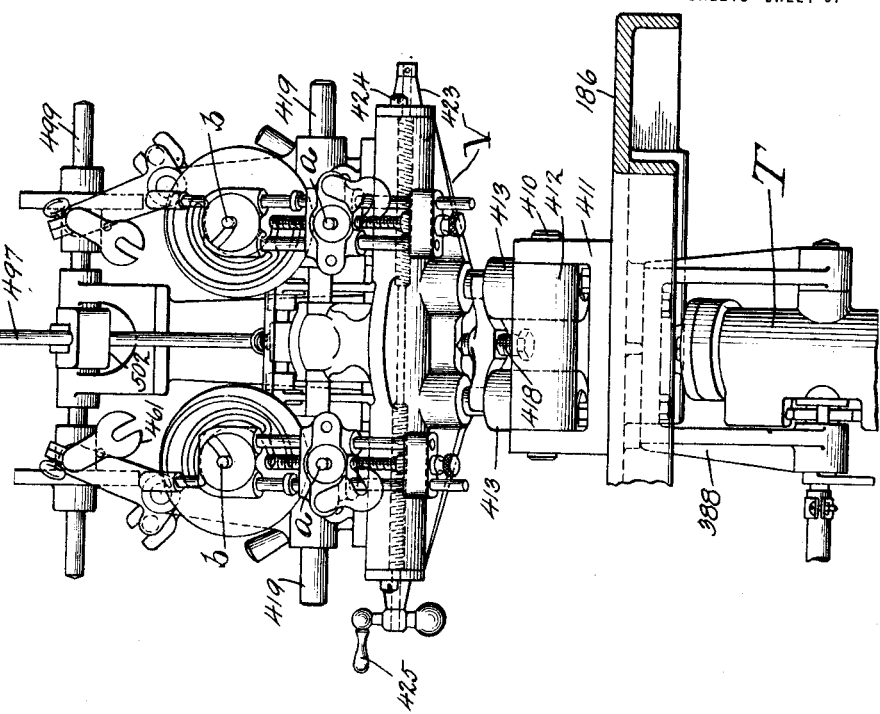
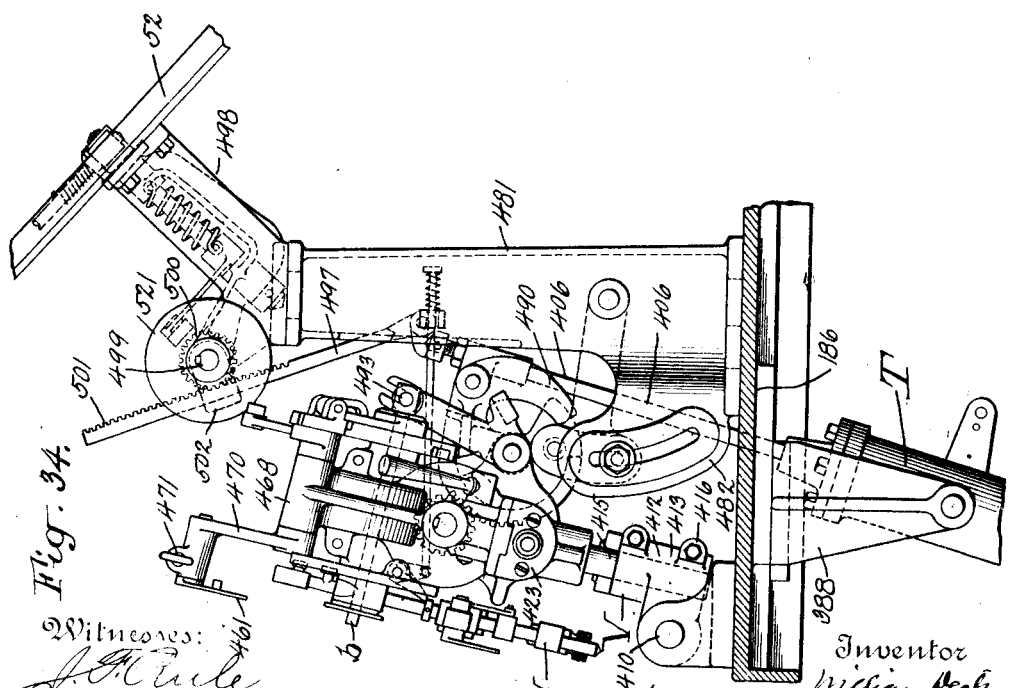

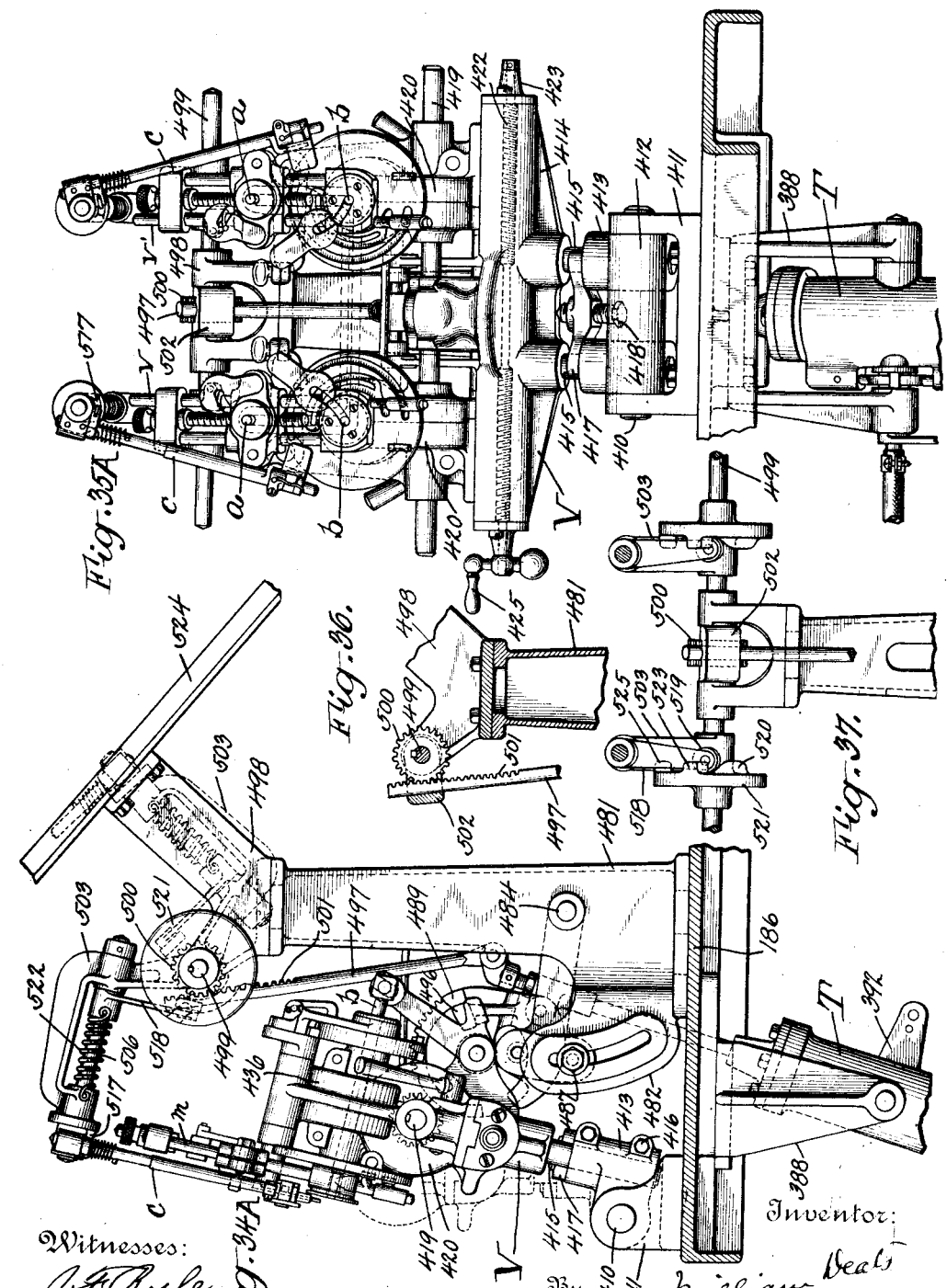

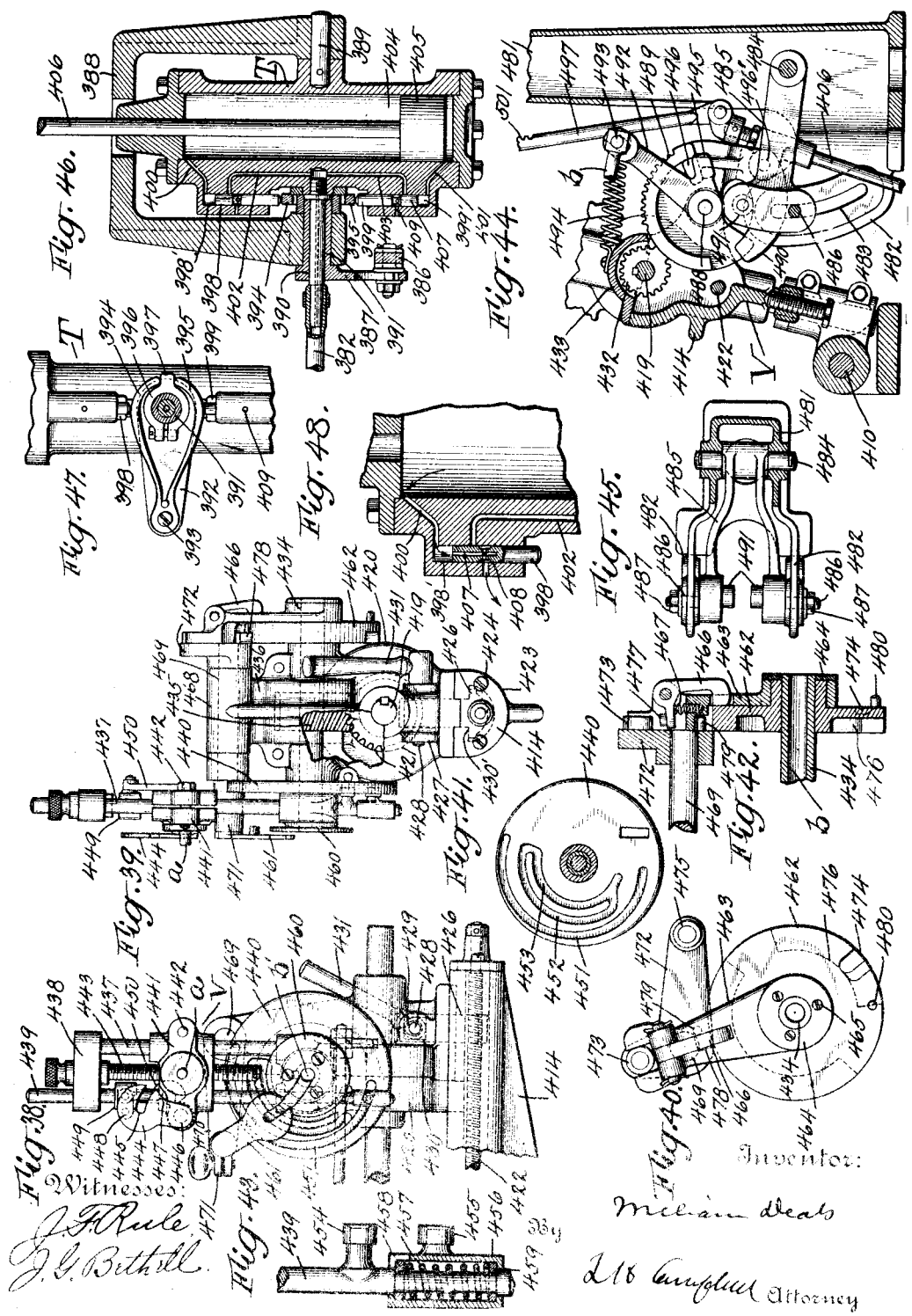

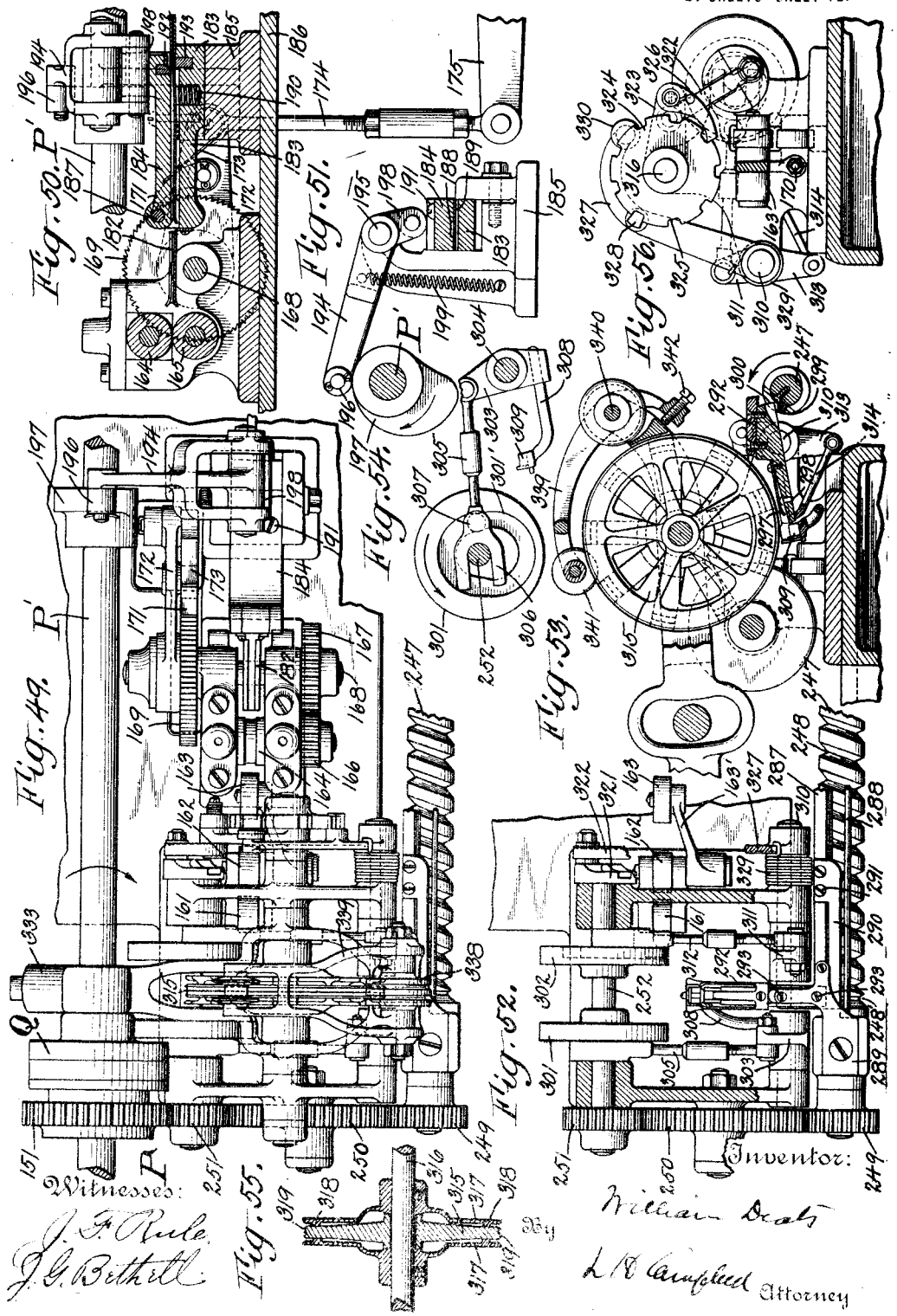

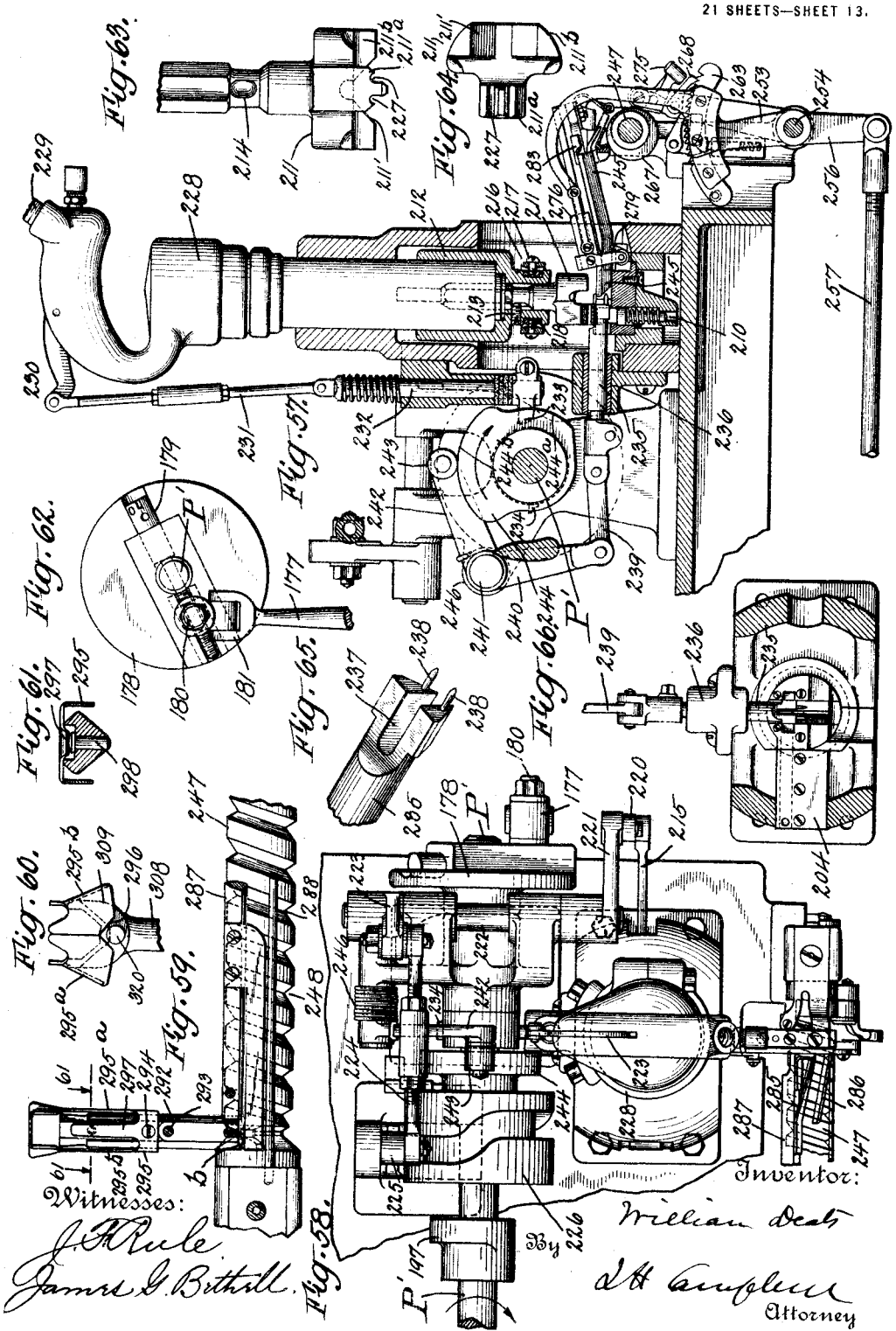

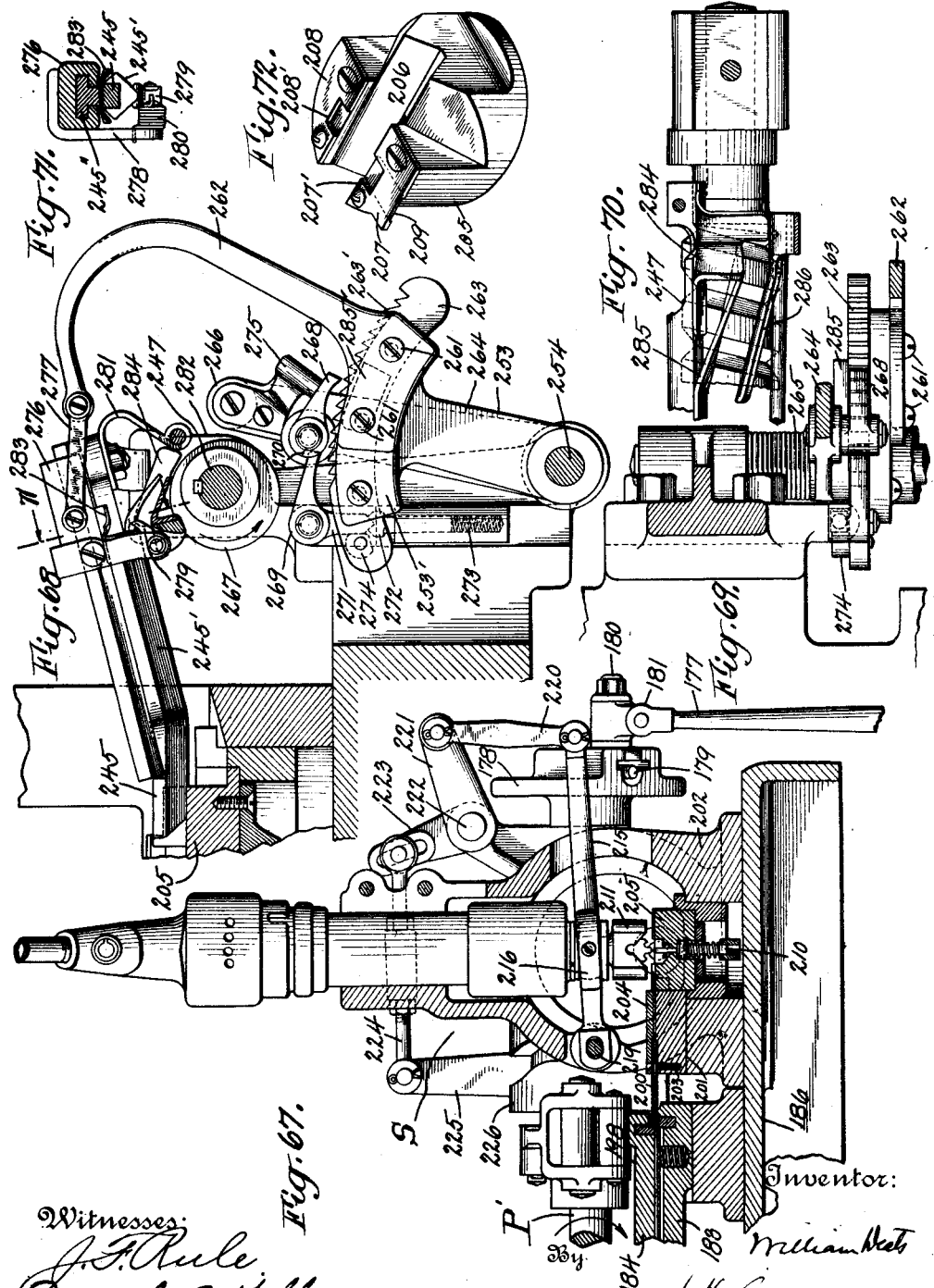

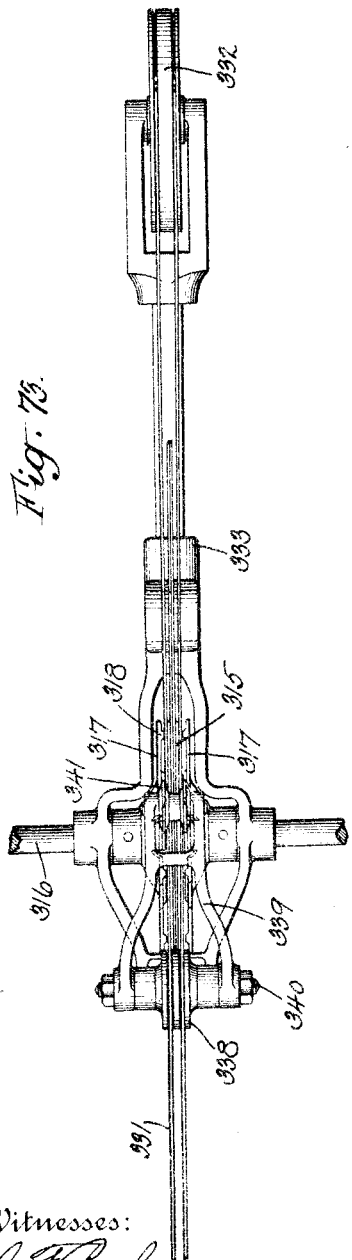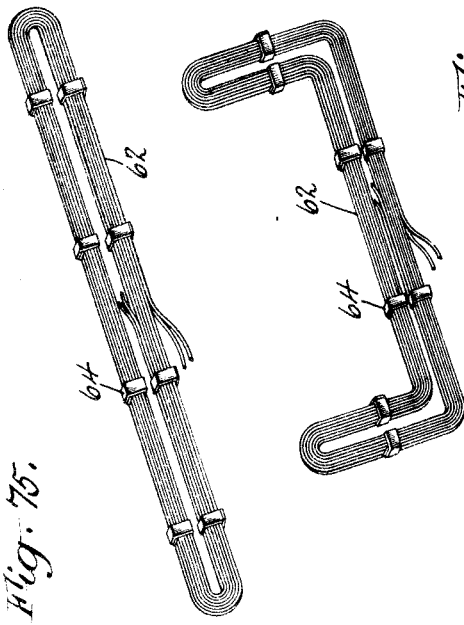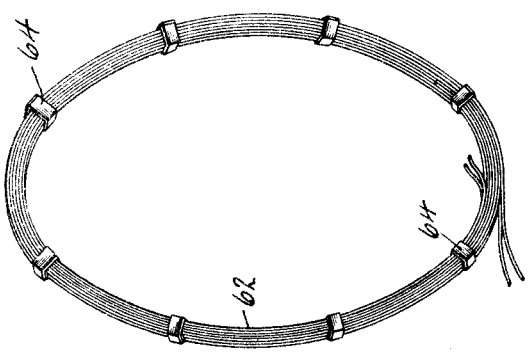

W. DEATS.
COIL MAKING MACHINE.
APPLICATION FILED MAY 1, 1912.
1,190,868.
Patented July 11, 1916.
21 SHEETS—SHEET 16.
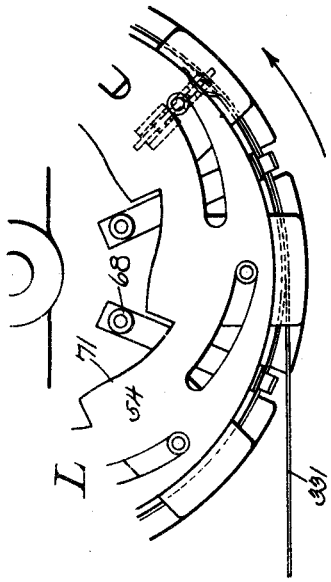
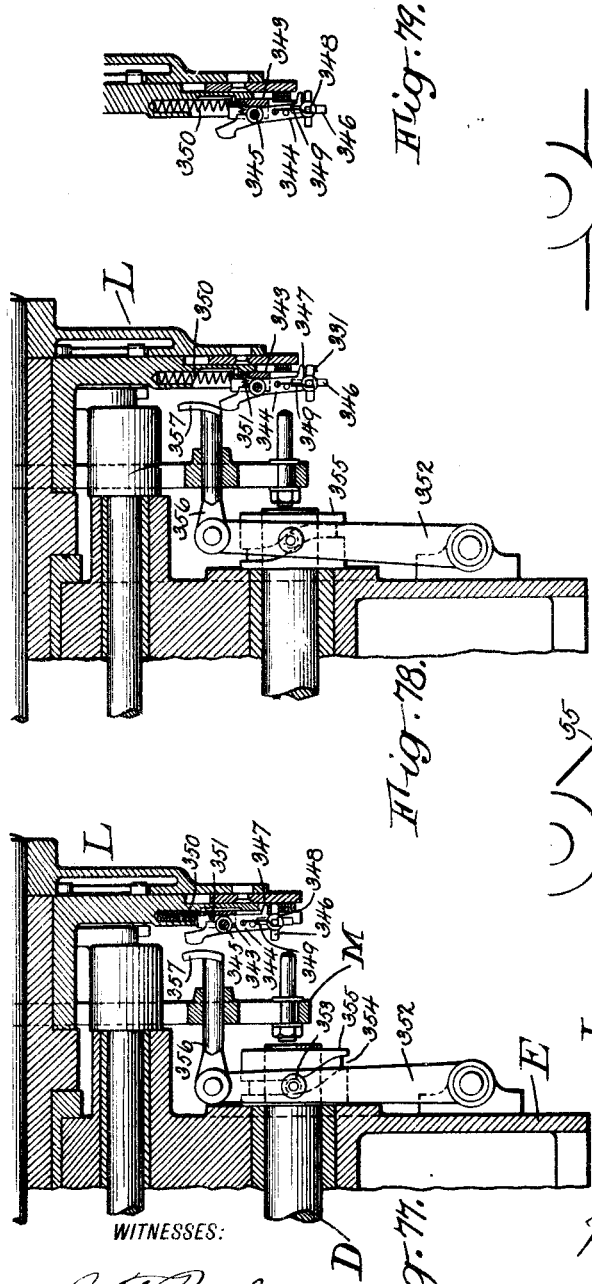
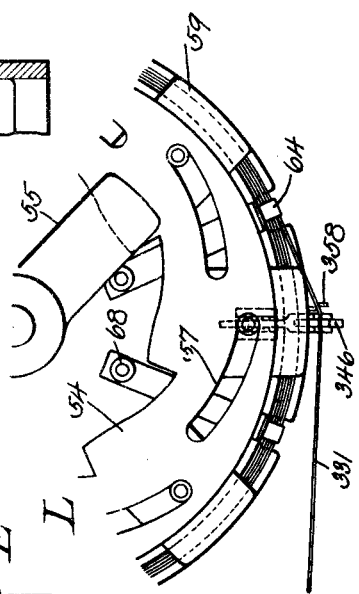
WITNESSES:
INVENTOR
William Deats
BY
ATTORNEY

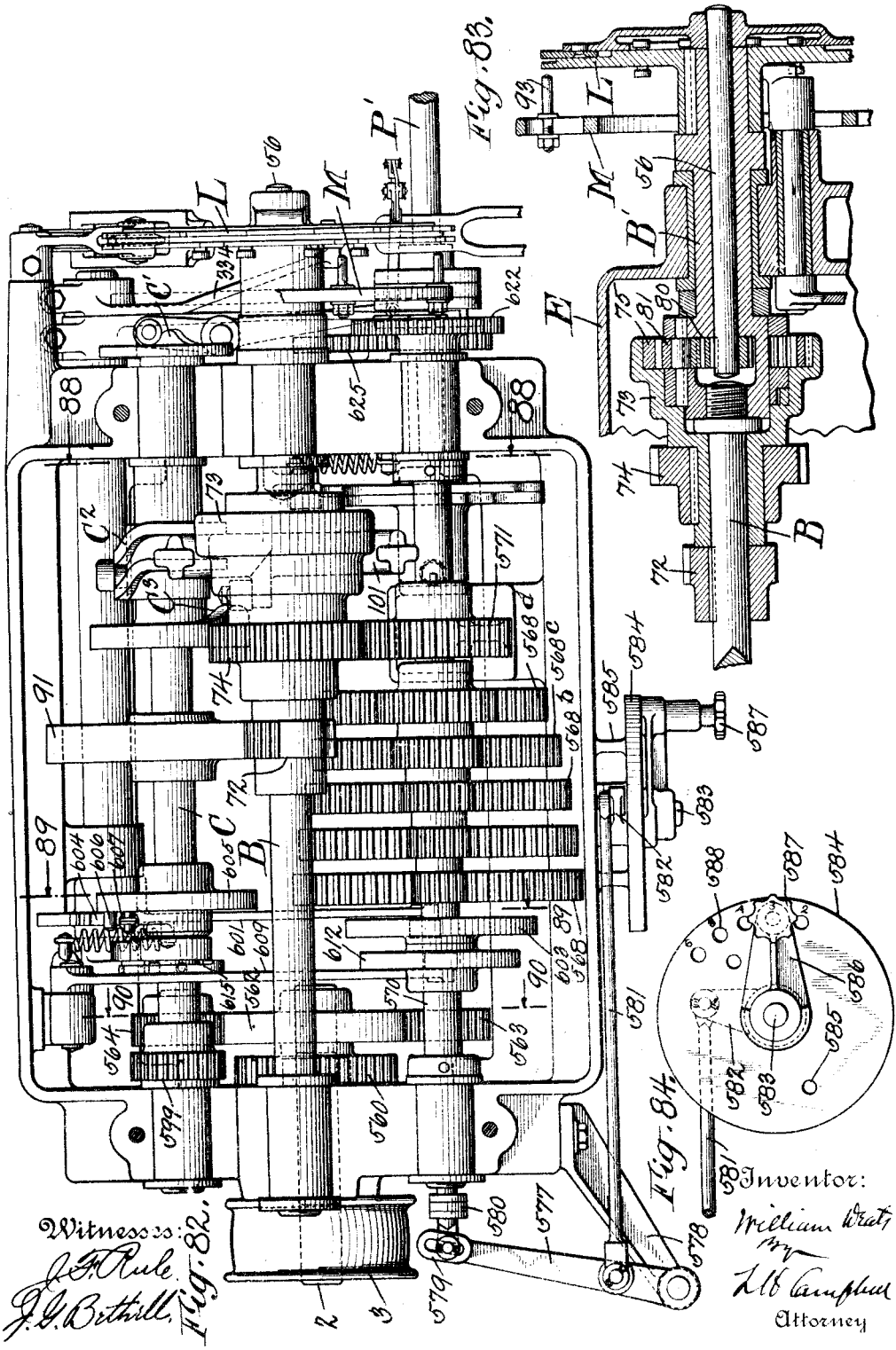

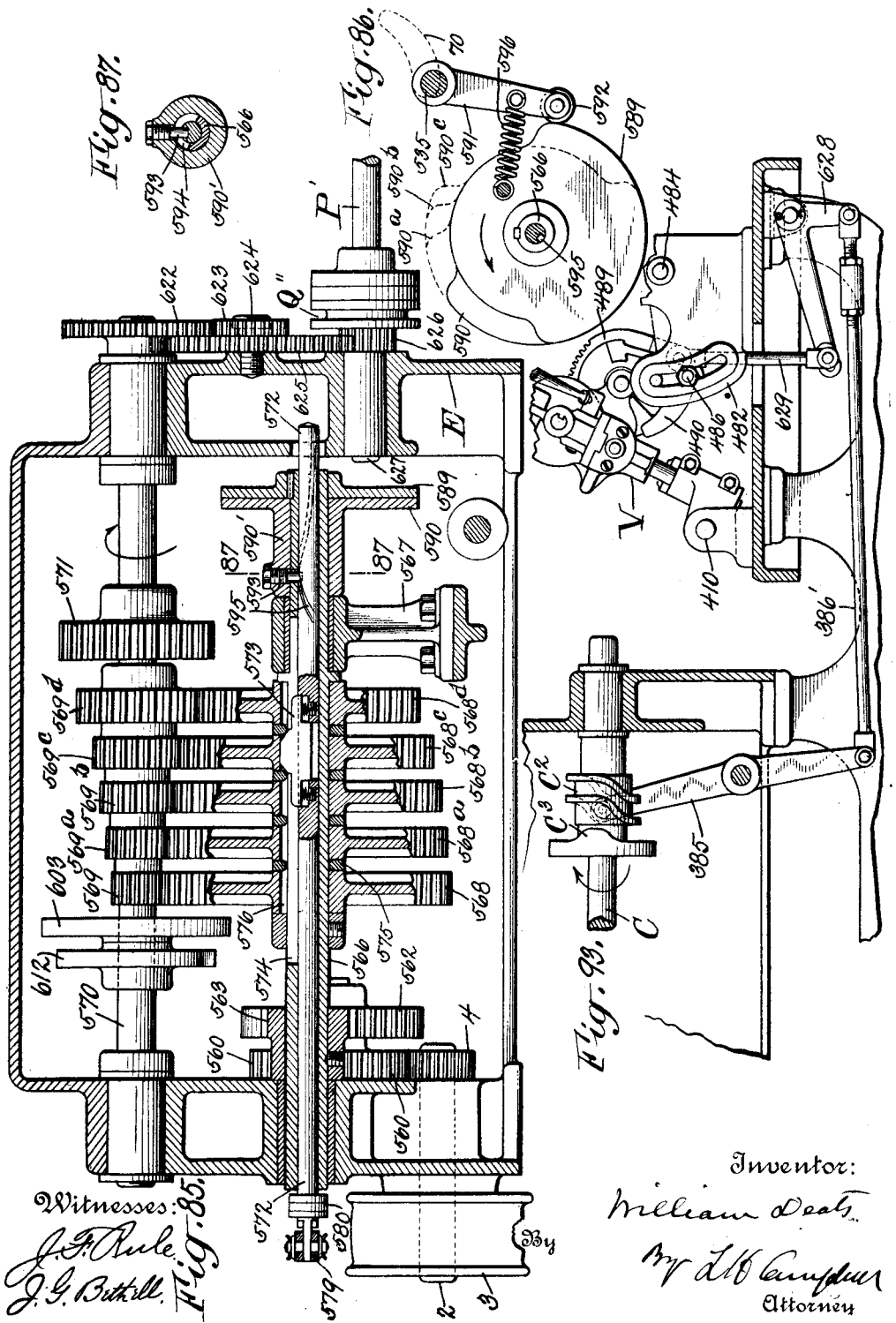

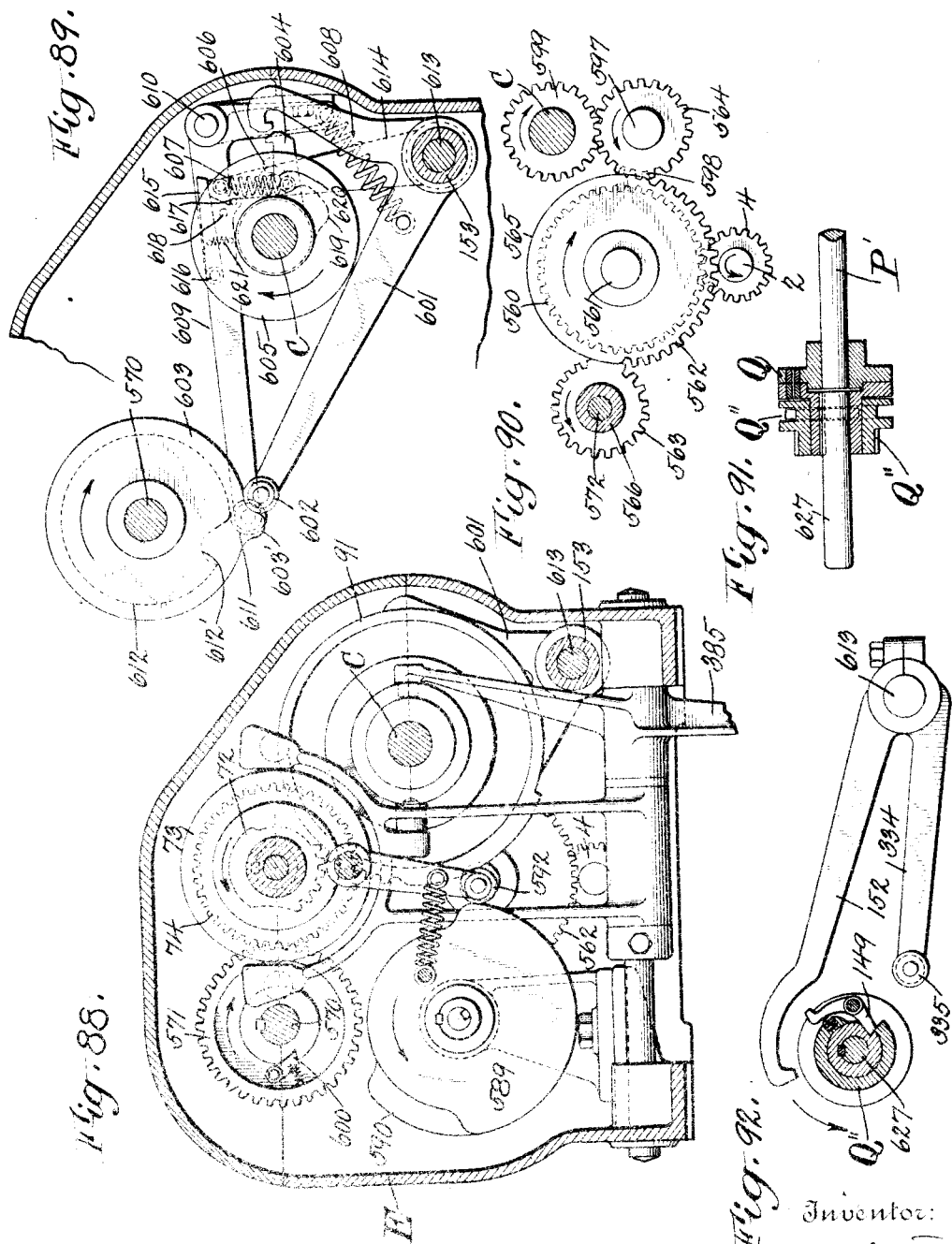

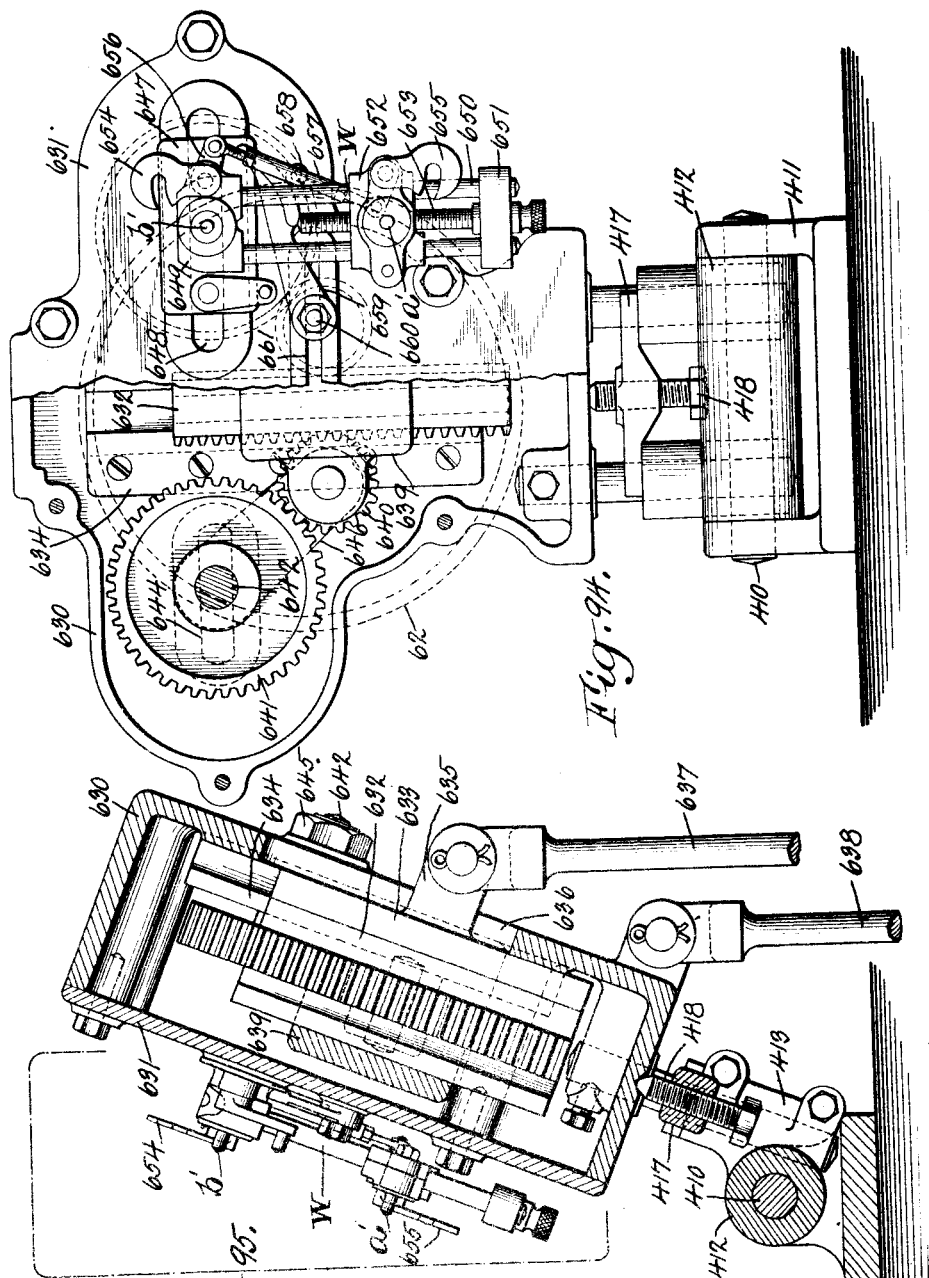

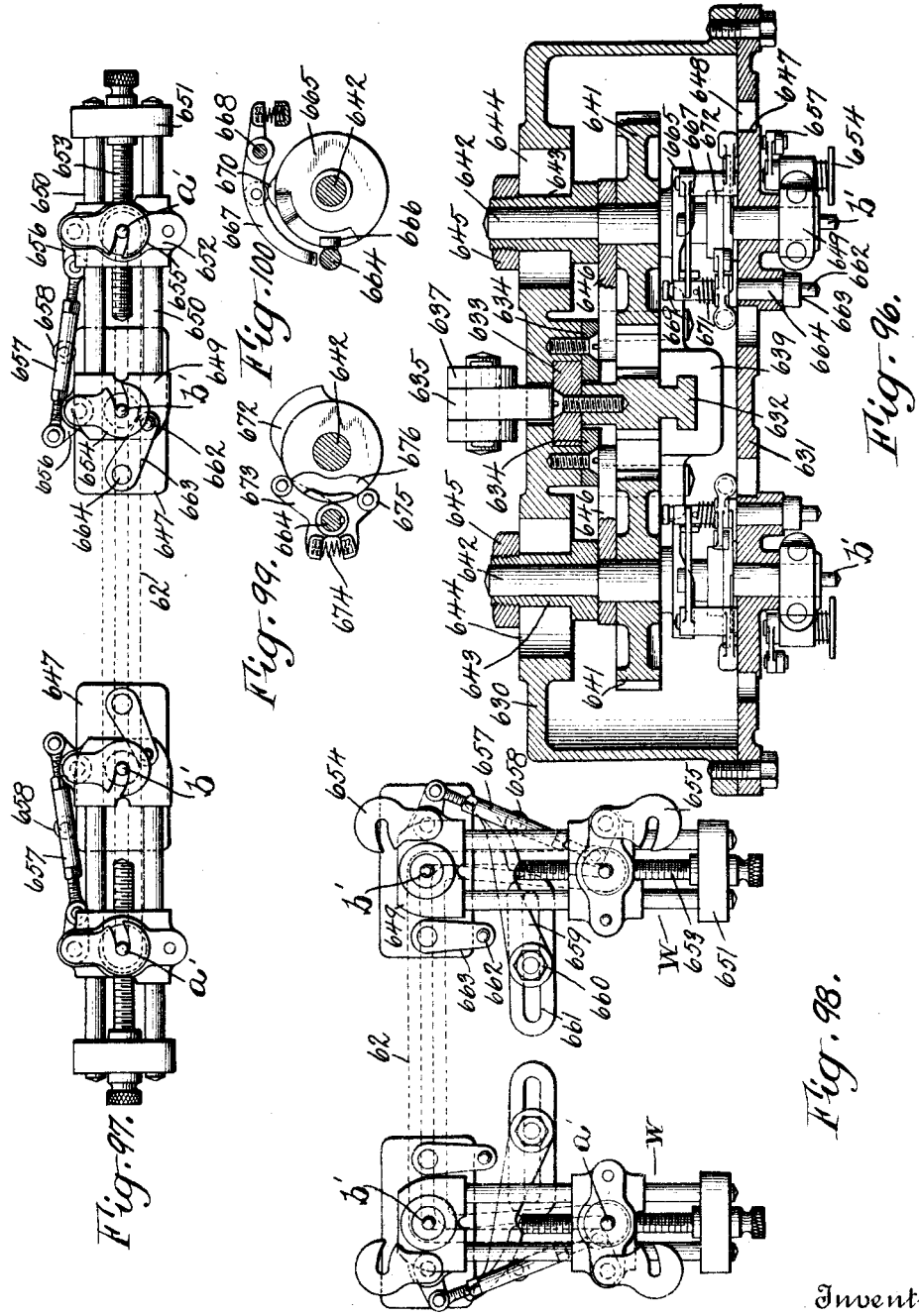

UNITED STATES PATENT OFFICE.

WILLIAM DEATS, OF YONKERS, NEW YORK.

COIL-MAKING MACHINE.

1,190,868.   Specification of Letters Patent.   Patented July 11, 1916.

Application filed May 1, 1912. Serial No. 694,488.

*To all whom it may concern:*

Be it known that I, WILLIAM DEATS, a citizen of the United States, residing at Yonkers, in the county of Westchester and State of New York, have invented a new and useful Improvement in Coil-Making Machines, of which the following is a specification.

My invention relates to a machine for making armature coils for dynamo-electric machines, and has for an object to provide a machine for performing various operations required in making such coils and which is entirely automatic in its operation.

The machine is designed to wind insulated wires into circular coils, to make metal clips and apply them to the coils, eight clips being applied to each coil; and to re-form the coil into an angular shape.

The machine comprises a chuck or reel on which a pair of insulated wires are wound to form a circular coil, mechanism for feeding and cutting a metal tape into short lengths and forming them into clips, means for feeding the clips to the insulated wires and carrying them on said wires to the chuck around which they are equally spaced in position to receive the wires as they are wound into a coil, means for clamping the clips to the coil, mechanism for transferring the coil from the winding chuck onto a bending form, and means for operating the bending form to bend the coil into substantially a U shape.

The exact nature of this invention, and the specific objects sought to be attained, will appear more fully hereinafter in connection with the detailed description of the machine and its method of operation.

Referring to the accompanying drawings—Figure 1 is a side elevation view of the machine with the exception of a small part of the upper portion which is broken away in order to permit the machine to be shown in one view on a sufficiently large scale for clearness of illustration; Fig. 2 is a plan view on a larger scale of power-transmitting gearing and cam-controlling devices contained in the casing E shown at the upper left hand side of Fig. 1; the cover portion of the casing being removed except a small portion at the right of Fig. 2 which is shown in section; Figs. 3, 4, 5 and 6 are sectional end elevation views taken substantially on the planes indicated by the section lines 3—3, 4—4, 5—5 and 6—6, respectively on Fig. 2, looking in the direction indicated by the arrows; Fig. 7 is a sectional plan view showing the lower portion of the mechanism contained in the casing; Fig. 8 is a detailed view on a larger scale of a coupling shown in Fig. 7; Fig. 9 is a detail showing a clutch mechanism for said coupling; Fig. 10 is a sectional elevation of the coil winding chuck, gearing for driving and operating the chuck, and means for ejecting the coil from the chuck; Fig. 11 is an end elevation view of the chuck; Fig. 12 is a sectional elevation giving a rear view of the winding chuck; Figs. 13 and 14 are sectional views of the gearing as indicated by section lines 13—13, and 14—14, respectively, on Fig. 10; Figs. 15, 16, 17 and 18 are detailed views of parts of the winding chuck, Figs. 15, 16 and 17, showing successive steps in the operation of the clip closing plungers; Fig. 19 is a part sectional view showing the winding chuck and mechanism for feeding the wires and clips to the chuck; Figs. 20 and 21 are plan and elevation views respectively of the wire cutting mechanism; Fig. 22 shows a modified form of wire cutting mechanism; Fig. 23 is a detail view showing the way in which a clip is supported and carried by the wires to the winding chuck; Fig. 24 is a sectional elevation view of the Geneva gear and associated mechanism; Fig. 25 is a sectional view showing the inner face of the Geneva gear and a clutch for controlling the operation of the same; Fig. 26 is front elevation view of an air motor for operating the main clutch; Fig. 27 is a sectional elevation view of the same on a larger scale; Fig. 28 is a part sectional plan view of the valve mechanism for said motor; Fig. 29 is a detail showing the centering springs for one of the valves; Fig. 30 is an enlarged detail view of the cams for operating the valves; Fig. 31 is a plan view partly in section of the mechanism located to the right of the gearing casing; Figs. 32 and 33 are detail views of one of the ejecting arms used in removing a finished coil from the bending form; Fig. 34 is a side elevation view of the coil bending and ejecting mechanism; Fig. 35 is a front elevation of the same; Figs. 34ᴬ and 35ᴬ correspond to Figs. 34 and 35, respectively, but with the mechanism operated to a different position; Figs. 36 to 45 inclusive are detail views of the mechanism shown in Figs. 34 and 35; Fig. 46 is a sectional view of an air motor for operating the coil bending mechanism; Fig. 47 is a detail showing means for operating the valves of said motor; Fig. 48 is an enlarged detail view showing one of the valves and the air passages leading therefrom; Fig. 49 is a plan view on an enlarged scale of a portion of Fig. 31; Fig. 50 is a sectional view of mechanism for feeding forward and cutting a tape of which the clips are formed; Fig. 51 is a sectional elevation view at right angles to Fig. 50 of cam mechanism for operating the tape cutter; Fig. 52 is a fragmentary view of mechanism shown in Fig. 49 but with certain parts removed to clearly show a portion of the clip feeding apparatus; Figs. 53 to 56, inclusive, are detail views of clip feeding mechanism shown in Fig. 49; Fig. 57 is a sectional elevation view showing the clip-forming dies and mechanism for operating the same, including an air-hammer; Fig. 58 is a top plan view of mechanism shown in Fig. 57; Figs. 59, 60 and 61 are details of a clip feeding mechanism, Fig. 61 being a section on the lines 61—61 of Fig. 59; Fig. 62 is a detail view of a connection shown at the right of Fig. 58; Figs. 63 and 64 are detail views of the upper clip-forming die; Fig. 65 is a detail showing a plunger for removing the clips from the dies; Fig. 66 is a sectional plan view showing the lower die and associated parts; Fig. 67 is a sectional elevation of the clip-forming mechanism shown in Fig. 57, the view being taken at right angles to that of Fig. 57; Fig. 68 is a view of pawl and ratchet mechanism for feeding the clips from the dies on to the spiral feed roller; Fig. 69 is a plan view of a portion of said mechanism; Fig. 70 is a detail showing means for guiding the clips on to the spiral feed roller; Fig. 71 is a sectional detail as indicated by the section line 71 on Fig. 68; Fig. 72 is a perspective view of the lower clip forming die; Fig. 73 is a plan view of a frame for guiding the wires to the winding chuck; Fig. 74 is a view of a coil which is to be operated upon by the bending form; Figs. 75 and 76 indicate successive steps in the bending of the coil, Fig. 76 showing the completed coil as far as the present invention is concerned; Figs. 77 to 81, inclusive, are detail views illustrating the wire pick-up mechanism; Fig. 82 is a view similar to Fig. 2 but showing a modification; Fig. 83 is a fragmentary sectional view of the winding chuck and driving gearing for the same as used in connection with the form of invention shown in Fig. 82; Fig. 84 is a detail view showing an indicator and adjusting mechanism for regulating the number of turns made by the winding chuck in the formation of each coil; Fig. 85 is a sectional elevation view of the mechanism shown in Fig. 82; Fig. 86 is a detail view of an adjusting cam shown in Fig. 85; Fig. 87 is a sectional detail as indicated by the section line 87—87 on Fig. 85; Figs. 88, 89, and 90 are sectional elevation views as indicated by the section lines 88—88, 89—89, and 90—90, respectively of Fig. 82; Fig. 91 is a detail view of a safety coupling and a clutch forming part of the mechanism shown in Fig. 82; Fig. 92 shows said clutch and means for operating the same; Fig. 93 shows a modification in which the pneumatic motor for operating the bending mechanism is replaced by mechanical driving connections; Fig. 94 is a front elevation view of a modified form of coil bending mechanism; Fig. 95 is a sectional side elevation of the same; Figs. 96 to 100, inclusive are detail views of the mechanism shown in Figs. 94 and 95.

Referring to Fig. 1 it will be seen that the entire machine is mounted on a suitable frame or base 1 at a convenient height to make the operating mechanism readily accessible. Mounted on the left hand end of this frame is a casing E, the upper portion of which forms a removable cover E' permitting ready access to the gearing within the casing. This casing serves to protect the operator as well as protecting the inclosed mechanism.

By referring to Figs. 2 to 7, inclusive, it will be observed that a plurality of shafts A, B, C and D extend longitudinally within the casing and are provided with a system of intermeshing gears. The shaft A which extends the entire length of the casing may conveniently be termed the driving shaft as all the power except that supplied to the air motors is transmitted through this shaft. The shaft B will be termed the winding shaft as the winding chuck is driven by this shaft. The shaft C carries a plurality of cams $C^1$, $C^2$, $C^3$, $C^4$, $C^5$, $C^6$, $C^7$, $C^8$, and $C^9$, and is herein referred to as the cam shaft. The cam $C^1$ controls the operation of the wire cutter. The cam $C^2$ operates the valves of the air motor which operates the coil-bending mechanism. The cam $C^3$ operates the ejector frame for transferring the coils from the winding chuck on to the bending form. The cam $C^4$ operates a stop for a gear wheel on the shaft A. The cam $C^5$ operates to hold the wire-guiding frame up into position to guide the wire and clips onto the winding chuck. The cam $C^6$ gives an initial movement of the clutch K from its left hand position toward the right. The cam $C^7$ controls the operation of the clutch shown in Fig. 9 for connecting the clip feeding mechanism to the driving shaft A. The cam $C^8$ controls the operation of the pawl and ratchet clip-feeding device shown in Fig. 68. The cam $C^9$ controls the clutch shown in Fig. 25 for effecting the operation of the Geneva gearing. The shaft D may be termed the adjusting shaft as its initial position may be adjusted to vary the number of convolutions in each coil.

Journaled in the casing E directly beneath the shaft A (see Figs. 6 and 7) is a shaft 2 having secured to its outer end the drive pulley 3 and near its inner end the driving pinion 4. The inner end of the shaft 2 has a bearing 5 in a plate 6 secured to the casing E. The drive pinion 4 meshes with a gear wheel 7 fixed to the drive shaft A.

The pulley 3 is connected by a belt 8 to any suitable source of power and is run continuously while the machine is in operation. The shaft A is therefore running continuously. Loosely mounted on the shaft A are gear wheels 9 and 10 located on opposite sides of a double friction clutch K. Any approved form of clutch may be used and the one herein shown is of well known construction and need not be described in detail. It may be noted, however, this clutch comprises a central member secured to and rotating with the shaft and carrying the clutch casing 11. This central member carries a double switch 12 which, when moved in either direction from central position, is adapted to spread a pair of levers 13 carried by said central member and force them into frictional engagement with a flange member 14 connected to the gear 10. It will thus be seen that when the clutch is shifted to the left it connects the gear wheel 10 with the drive shaft A. When the clutch is shifted to the right it connects the driving shaft in a similar manner with the gear wheel 9.

The mechanism for shifting the clutch is as follows: Referring to Figs. 1, 2, 4 and 7, it will be seen that a shaft 15 is journaled in the lower portion of the casing E and extends transversely of the casing. Secured to this shaft is a sleeve 16 formed with an upwardly extended bracket 16' provided at its upper end with a yoke 17 carrying lugs or anti-friction rollers 18 extending into a recess formed in the clutch casing. The inner end of the yoke 17 is provided with an L-shaped extension 19 carrying an anti-friction roller 20 in the path of movement of the cam C⁶. The yoke 17 also carries an anti-friction roller 21 movable into the path of a cam projection D³ formed on a cam disk D² secured to the shaft D. With the parts in the position shown in Fig. 2, the clutch K is in its left hand position and as the cam C⁶ moves into engagement with the roller 20 the clutch is given an initial movement toward the right. The movement of the clutch to the right is completed by a pneumatic motor F, the construction and operation of which will presently be described. The clutch remains in the right hand position until the cam D³ engages the roller 21 and gives the clutch an initial movement toward the left, such movement being completed by the air-motor F.

The construction of the air-motor F, which may be termed the clutch motor, is shown in Figs. 1, 2 and 26 to 30 inclusive. This motor comprises a casing 25 mounted on a bracket 26. The upper portion of this casing is in the form of a cylinder 27 having cylinder heads 27ᵃ and 27ᵇ bolted thereto. Within the cylinder is a piston 28 having a piston rod 29 connected by a link 30 to a lever 31 keyed to the shaft 15. The lever 31 is provided with a handle 32 to permit the motor to be operated manually when desired. Journaled in a bracket 36 above the motor cylinder is a rock shaft 34 to which is secured a crank arm 33. A link 35 connects this crank arm to the lever 31. The outer end of rock shaft 34 carries a depending arm 33' to the lower end of which are secured inner and outer cams 37 and 38. The lower portion of the casing 25 is formed with two cylindrical bores in which are secured stationary cylindrical plugs 39 and 39'. Within these plugs are piston valves 40 and 40' movable longitudinally in valve chambers formed in the plugs. The valve chambers connect with the atmosphere through passages 41 formed in the plugs and openings 42 in the casing 25. Ports 43 lead from the valve chambers to the ends of the cylinder 27. A pipe 44 connected to a suitable supply of compressed air, is in communication with the spaces formed at the inner ends of the plugs 39 and 39'. Journaled in the valve casing are stud shafts 45 and 45' formed at their outer ends with disks 46 and 46'. On the inner faces of these disks are cam rollers 46ᵃ and on the outer faces of the disks are similar rollers 46ᵇ. Within the valve casing are cam disks provided with cams 47 and 47'. These cam disks have a yielding connection with the said shafts 45 and 45' through springs 48. Each of these springs bears at one end against a pin 49 on the cam disk and a pin 50 on the stud shaft.

The drawings show the position of the valve mechanism when the operating lever 31 has been moved to the left. If the lever 31 is now moved a short distance to the right, either by hand or by the cam C⁶ (Fig. 2), the cam 37 (Fig. 26) will engage the roller 46ᵃ and rotate the cam 47 (Fig. 28) to the left, thereby moving the valve 40 rearwardly. As the valve is thus moved, the port 41 is first closed, cutting off connection between the atmosphere and the left hand end of the piston 28. The continued movement of the valve 40 opens its valve chamber to the pipe 44 and permits the compressed air to flow through the valve chamber and the passage 43 into the left hand end of the motor cylinder and completes the throw of the piston to the right. The right hand end of the cylinder is open to the atmosphere during this movement and permits the escape of the air from in front of the piston. During this movement, the outer cam 38 (Figs. 26 and 30) bears against the roller 46ᵇ on the disk 46′, and thereby acts as a positive means to prevent the disk 46′ from being rotated into position to operate the valve 40′. As the piston completes its stroke, the cam 37 rides off the pin 46ᵃ and permits the left hand valve to center itself. The piston during its movement to the right, completes a stroke of the lever 31. The parts are now in a reverse position from that shown in Fig. 26. The operation of the motor F and valve mechanism, when the piston is being moved to the left, is similar to the operation just described and will be readily understood without further description.

The coil winding chuck and operating mechanism therefor, are shown in Figs. 2 and 10 to 18, inclusive. The end of the winding shaft B has a screw-threaded connection with a hollow shaft B′ which thus forms a continuation of the shaft B. The end of the hollow shaft abuts against a collar 51 formed on the shaft B. The winding chuck L comprises a body portion substantially in the form of a disk 52 provided with a hub 53 keyed to the hollow shaft B′. On the front face of the winding chuck is an annular cam plate 54 concentric with the part 52 and adapted to have a limited rotary movement relative thereto. The cam plate 54 is supported by a yoke 55 keyed to a shaft 56 which extends through and is journaled in the hollow shaft B′. The cam plate 54 is provided with a series of inclined cam slots 57, each of which embraces a guide roller 58 secured to a guide plate 59. The disk 52 is formed with recesses to receive the guide plates 59, the latter being slidable radially therein. The disk 52 is formed with a peripheral flange 60, which, together with the plates 59, when the latter are in their outward position, forms an annular groove 61 to receive the insulated wires 62 which form the coil. The disk 52 is provided with notches 63 to receive the metal clips 64 which are automatically placed in position to receive the coil as hereinafter described. The disk 52 is formed with radial slots 65 in line with the recesses 63 to receive clip closing arms or plungers 66. The latter, as shown in Figs. 16 to 18, have a tongue and groove connection with the plate 52. Each arm 66 is provided at its upper end with a recess to form a pair of jaws 67, 67′, which as the arm is moved radially outward, engage the open clip 64 (Fig. 15) and close it as shown in Fig. 16. Each arm 66 is provided with cam engaging rollers 68 and 69 on its outer and inner faces, respectively. Figs. 10 to 12 show the parts in the relative position assumed during the winding operation. While the coil is being wound the shafts B′ and 56 rotate together as a unit. After the coil is wound or during the final winding revolution of the chuck, a cam 70, (see Fig. 12) is held outward in position to engage the rollers 69, successively, and move the arms 66 outward to close the clips 64. After the coil is thus completed, the cam ring 54 is given a backward or counterclockwise rotation relative to the disk 52, to open the chuck. That is, by the backward rotation of the cam ring, the rollers 58 are carried to the inner ends of the slots 57, thereby retracting the guide plates 59. At the same time the rollers 68 on the arms 66 are engaged by cams 71 formed on the inner edge of the cam ring, and the arms 66 are thereby drawn inward to the position shown in Fig. 17. The coil is now free to be transferred from the winding chuck onto the bending form as hereinafter described.

The gearing for operating the chuck comprises a segmental toothed gear 72 keyed to the shaft B. Adjacent the gear 72 is a stepped sleeve 73, loosely mounted on the shaft B and forming a casing inclosing the gears shown in Fig. 13. Keyed to the sleeve 73 is a gear wheel 74. An internal annular gear wheel 75 is secured by a pin 76 (Fig. 13) in the large end of the sleeve 73. Within the casing 73 is a collar 77, which, as shown in Fig. 14, is keyed to the hollow shaft B′. The collar 77 is formed with an arc-shaped recess 78, into which extends a lug 79 formed on the casing 73. This construction permits a limited relative rotation of the shaft B and the gear casing 73. Keyed to the inner end of the shaft 56 is a gear pinion 80 which meshes with an idler pinion 81, the latter in turn meshing with the annular gear 75. The pinion 81 is mounted on a stud shaft 82 having bearings in the collar 77 and a collar 83. It will be observed that the pinion 82 is carried by the shaft B′. The winding shaft B is adapted to be driven through two separate trains of spur gears. The first train of gears for driving the winding shaft at a slow speed is as follows: A gear wheel 85 loose on the drive shaft A and connected to rotate with the gear wheel 10, meshes with a gear wheel 84 loose on the shaft B. A gear pinion 86 also mounted on the shaft B and connected to rotate with the gear wheel 84, meshes with a gear wheel 87 secured to the shaft C. A ring gear 88 in mesh with the gear wheel 74 carries spring pressed pawls 89 which engage a disk 90 secured to the shaft C (Fig. 3). Through the train of gears just described, the winding shaft is driven at slow speed, that is, the speed of the winding shaft is reduced to ¼ that of the drive shaft A. This slow speed is employed during the first revolution of the winding chuck. The main clutch K is then operated to the right hand position and the winding shaft driven through the gears 9 and 74.

The operation of the gearing just described and that shown in Fig. 10 for driving the winding chuck will now be set forth: The parts are shown in the position assumed after the coil has been completed, but before the chuck has opened to permit the discharge of the coil. The disk 91 (Figs. 2 and 4) on the cam shaft C is rotated to bring the gear teeth $91^a$ formed thereon into mesh with the segmental gear 72 and thereby rotate the shaft B to open the winding chuck. By reference to Fig. 13 it will be seen that this rotation of the shaft B imparts to the pinion 81 a movement bodily about the axis of the shaft B, and at the same time owing to its engagement with the internal gear 75, which at this time is held stationary, causes the pinion 81 to rotate about its own axis in a clockwise direction. This imparts to the pinion 80 and spindle 56 a counterclockwise rotation. The angular speed of the gear 80 being greater than that of the winding shaft, the cam ring 54 of the winding chuck (Fig. 11) is rotated to open the chuck. The lost-motion connection shown in Fig. 14 permits the operation just described. After the winding chuck has been opened, the ejector operates as will be presently described to transfer the coil to the bending form. The gear 74 and gear casing 73 are now operated. The initial rotation of the gear casing and annular gear 75 (Fig. 13), rotates the pinion 81, and through it rotates the gear 80 in a clockwise direction to close the winding chuck. The gears shown in Fig. 13 are now locked together and rotate as a unit, the slow speed gearing operating first to impart the initial slow rotation to the chuck. The main clutch is then operated and the winding of the coil is completed through the high speed gearing.

The ejector M (see Figs. 2, 10, 11) comprises a ring frame carrying an annular series of pins 93 adjustably secured in radial slots 94. The pins 93 are preferably positioned to engage the clips 64. The ejector frame is carried by two plunger rods 95 rigidly secured thereto. The rods 95 are slidably mounted in hollow cylindrical bosses 96 formed in the end of the casing E'.
Each rod 95 is provided with a shoulder 97 adapted to bear against a sleeve 98 secured in the inner end of the boss 96. A coil spring 99 mounted on the rod 95 bears at its front end against a stationary sleeve 100, and at its rear end against the shoulder 97. The ejector frame is thus normally held in its retracted position. The means for operating the ejector comprises a yoke 101 (see Figs. 2 and 3), carried at the upper end of arms 102, 102'. These arms are formed on bearing sleeves 103, 103' mounted on a shaft 104, located in the lower portion of the casing and extending transversely thereof. The yoke 101 carries a cam-engaging roller 105 in the path of movement of the cam $C^3$, the latter being formed on the disk 90 (Fig. 3) of the ring gear 88. When the cam $C^3$ engages the roller 105, the ejector M is carried to the right, the pins 93 thereby engaging the coil and transferring it to the bending form. The cam $C^3$ is timed to operate the ejector while the winding chuck is open.

The number of revolutions made by the winding shaft during the formation of a coil, and consequently the number of strands of wire in the completed coil, is controlled by the position of the cam disk $D^2$ which is adjustable, as will presently be described.
The cam disk $D^2$ is rotated by the Geneva gearing; said gearing and mechanism for controlling and operating the same will be understood by reference to Figs. 1, 2, 6, 7, 24 and 25. The Geneva gear wheel N is keyed to a hollow shaft 110 loosely mounted on the shaft D. Keyed to the outer end of the shaft D is a crank arm 111, the outer end of which is formed with a bearing sleeve 112 to receive a spring-pressed locking pawl 113. The inner end of said pawl is adapted to engage in one of a series of openings 114 formed in the gear wheel N. A handle 115 on the locking pawl permits the latter to be readily retracted and the crank arm rotated to adjust the position of the cam $D^2$ relative to the gear wheel N. The spring 116, bearing against a shoulder 117 formed on the locking pawl, holds the parts locked in adjusted position. A series of figures may be stamped in the periphery of the gear wheel N as shown in Figs. 1 and 2, to indicate the adjustment for any desired number of windings in the coil. The inner face of the Geneva gear N is formed with an annular flange having radial portions cut away at equal intervals to form cam teeth 118. The shaft B carries a clutch O comprising a disk 119 keyed to the shaft and a disk 120 loose on the shaft. Pawls 121 and 122 are pivoted to the disk 120, each of said pawls being formed with a nose adapted to engage a notch 123 in the disk 119. A lever 124 pivoted to the disk 120 is caused, by means of a spring 125, to bear against the nose of the pawl 121, and hold the latter in locking position. The tail of the pawl 121 bears against a lever 126 also pivoted to the disk 120, the opposite end of said lever in turn holding the pawl 122 locked. The disk
120 120 carries a pin 127, which as it rotates with the shaft B rides up and down in the slots of the gear N at the same time rotating the gear N. Each complete rotation of the pin 127 rotates the disk N the angular distance between the centers of two adjacent teeth 118. As the operation of this type of gearing is generally understood it need not be further described.

The clutch O is controlled and operated by the following mechanism. The cam C' on the shaft C is adapted to operate a bell crank lever 128 pivoted on the shaft 129. The upper end of the bell crank lever 128 carries a roller 130 which bears against the cam C⁹. The horizontal arm of the bell crank lever is connected through a link 131 to a crank arm 132 carried by a rock shaft 133 journaled in the front end of the casing. Secured to the forward end of the rock shaft 133 is a clutch-releasing arm or dog 134, which, when the cam C⁹ is in the position shown in Fig. 6, is held in the path of the clutch pawl 122. The dog 134 therefore serves to release the pawl 122, and through the lever 126 also releases the pawl 121, thereby permitting the shaft B to rotate without driving the Geneva gear. The rock shaft 133 also carries the rock arm 135 on the end of which is a roller 136 in the path of a cam 137 secured to the shaft B. A tension spring 138 is connected at one end with the vertical arm of the bell crank lever 128 and at its opposite end to a horizontal rock arm 139, sleeved on the shaft 129. On the forward end of the shaft 129 is secured an upwardly extending rock arm 140 which carries a locking stud 141 adapted to enter the radial slots 118' in the gear N. The operation of the locking pin 141 is as follows: When the shaft B is driving the Geneva gear N by means of the clutch O, the gear N is rotated intermittently. That is, while the pin 127 of the clutch O is passing through the lower half of its revolution it is in engagement with a tooth 118 and moves the gear N forward. The cam 137 during this movement is in engagement with the roller 136 on the rock arm 135 and through the connections shown in Figs. 6 and 7, holds the locking pin 141 out of the path of the gear N. As the clutch pin 127 passes through the upper half of its revolution, the cam 137 is out of engagement with the roller 136 and permits the spring 138 to pull the locking pin 141 into a slot 118' and lock the gear N. It will thus be understood that, while the shaft B rotates and through the clutch O drives the gear N, the locking pin 141 swings in and out of locking position and that the gear N is rotated intermittently during the intervals when the pin 141 is out of locking position.

Referring to Figs. 6, 7 and 24, it will be observed that a mutilated gear wheel 142 is keyed to the hollow shaft 110. A disk D⁴ is keyed to the hub of the gear wheel 142. This disk is formed with a notch 143 adapted to receive a roller 144 on the end of the rock arm 139. The spring 138 holds the roller 144 against said disk, and, when the latter is brought to the position shown in Fig. 6, engages said notch and holds said disk in starting position. It will be seen that the device just described serves to hold the shaft D in its initial or starting position. The gear wheel 142 has a mutilated portion 142ᵃ which, as shown in Fig. 6, permits an independent rotation of the mutilated gear 87. The coöperation of said gears will be more particularly described hereinafter in connection with the general statement of operation.

Fig. 31 gives a general plan view of the mechanism for feeding the tape from which the clips are formed, cutting the tape into suitable length, forming it into clips, and feeding the clips to the winding chuck. Such mechanism is operated by power supplied through a shaft P. Referring to Figs. 4 and 7, a gear pinion 145 secured to the shaft P, meshes with and is driven by the gear 10 on the drive shaft A. In line with the shaft P is a shaft P' connected thereto through a coupling Q. This coupling comprises members 146 and 147 (see Fig. 8), keyed to the shafts P and P', respectively. A coupling pin 148 connects said members and drives the shaft P' under normal conditions, but gives way under an excessive load, thereby forming a safety device. The coupling member 146 also comprises one member of a clutch Q' (see Fig. 9). The other member 148 is loosely mounted on the hub of the member 146. A clutch dog 149 pivoted in an annular groove 150 in the clutch member 148, is adapted to engage a notch in the clutch member 146 and thereby lock the clutch members. A spur gear 151 is formed integral with the clutch member 148. The clutch Q' is adapted to be released by a rock arm 152 movable into and out of the path of the clutch dog 149. The arm 152 (see Figs. 7 and 31) is clamped to a sleeve or hollow shaft 153 which forms a middle shaft of three concentric shafts 154, 153 and 155. Secured to the opposite end of the shaft 153 is an arm 156 carrying a roller 157 which rides on the cam disk C⁷. A spring 158 holds the roller 157 against the cam disk.

The clips for binding the coils are preferably made from a ribbon or tape of soft steel. As shown in Fig. 1, this tape 159 is supplied from a roll 160 conveniently mounted on the side of the frame 1. The tape is carried over a series of guide rollers 161, 162 and 163, (Figs. 1, 49 and 52), to a pair of feed rollers 164, 165. The latter are operated by means of intermeshing spur pinions 166 secured to the feed roller shafts. The upper pinion 166 is driven by a spur gear 167 secured to a shaft 168. The guide roller 163 is carried by an arm 163' adjustable by means of an adjusting bolt 170 (see Fig. 56), so that the roller 163 may be adjusted to feed the tape horizontally to the feed rollers 164, 165. The pawl and ratchet device for driving the feed rollers comprises the ratchet wheel 169 secured to the shaft 168 and a pawl 171 pivoted to a rock arm 172 journaled on the shaft 168. A leaf spring 173 holds the pawl in engagement with the ratchet. The means for operating the arm 172 comprises an adjustable link 174 connected to a lever 175 (see Fig. 1) pivoted to the frame 1. The outer end of the lever 175 is connected by means of a universal joint 176 (Fig. 1) to a vertical rod 177, the upper end of which is adjustably connected to a crank disk 178 secured to the end of the shaft P'. This adjustable connection is shown in Figs. 58, 62 and 67. The disk 178 is bored to receive a connecting pin or rod 179, having a reduced portion which extends through the shaft P'. The reduced end of the rod 179 is threaded to form an adjustable connection with a wrist pin 180, the latter having a sliding connection with the disk. A universal joint connection 181 is provided between the wrist pin and the rod 177. As the shaft P' rotates, the tape is fed forward by an intermittent or step-by-step motion imparted to the feed rollers through the mechanism just described. Each rotation of the shaft P' feeds forward a length of tape sufficient to form a clip. As the tape leaves the feed rollers, it passes through a guide 182 (Figs. 49 and 50), and from thence between the shearing arms 183, 184. The arm 183 is fixed, being clamped in a standard 185 (Fig. 51), mounted on a platform 186. The upper shearing arm 184 is connected to the lower arm by a pivot 187. The arm 184 is formed in its under surface with a recess 188 for the passage of the tape. A sheet metal strip 189 is carried by the arm 184 and holds the tape in position in the slot 188. A coil spring 190 seated in the stationary arm 183 bears against the under face of the strip 189. A bolt 191 extending freely through the movable arm 184 and threaded into the arm 183 forms an adjustable stop to limit the upward movement of the shearing arm. A pair of shearing bars 192 and 193 are carried by the arms 184 and 183, respectively. The means for operating the shear comprises a lever 194 connected by a pivot 195 to the standard 185. One end of the lever 194 carries a roller 196 bearing on a cam 197 secured to the shaft P'. The opposite end of the lever 194 is in the form of a yoke and carries a roller 198 which bears against the upper face of the shearing arm 184. Each rotation of the shaft P' operates through the cam 197 and lever 194 to force the shearing arm 184 downward and shear off a length of the tape to form a clip. A spring 199 holds the lever 194 against the cam. The spring 199 serves to lift the shearing arm 184 after it has been operated by the cam.

The clips are fed forward from the shears to the punch press S where they are pressed into shape preparatory to being fed to the winding chuck. The clips first pass through a guide 200 (see Fig. 67), comprising metal strips carried by a block 201 mounted on a frame 202. A spring 203 seated in the block 201 bears upwardly against the lower member of the guide 200. The upper face of the block 201 is recessed for the passage of the clips. A cover plate 204 extends over said recess and also forms a holding means for the guide 200.

The lower die 205 shown in perspective in Fig. 72 consists of a block formed with an approximately V-shaped recess 206. The bottom of this recess consists of a narrow horizontal section. To the upper horizontal face of the die are secured two plates 207, 208, provided with notches 207', 208', respectively, to receive the ends of the clip. The plate 207 is undercut or formed with a recess 209 on its under face for the passage of the clip. In order to hold the clip up in a horizontal position as it is fed across the die, a spring-pressed pin 210 (Figs. 57, 67), is provided. The upper die 211 is carried by a cup shaped member 212. A set screw 213 threaded in the member 212 enters an elongated depression 214 in the neck of the die 211 and permits a limited reciprocating movement of the die relative to the member 212 in a vertical direction. The means for operating the die, comprises a lever 215 formed with a yoke or loop 216 surrounding the neck of the member 212 and pivotally connected thereto by means of screws 217 threaded into a collar 218 surrounding said neck. One end of the lever 215 is connected by a pivot pin 219 to the frame 202. The opposite end of said lever is connected by a link 220 to a crank arm 221 secured to a rock shaft 222. On the opposite end of the rock shaft is fixed a rock arm 223 having an adjustable connection with a link 224 adjustable in length. The link 224 connects with a cam lever 225 operated by a cam 226 secured to the shaft P'. The die 211 comprises two forms 211ª, 211ᵇ, which operate successively on the clips. The form 211ª (Fig. 63) is substantially in the form of an inverted V corresponding to the recess 206 in the lower die, and it is also provided with grooves 227 for a purpose to be described later.

When a clip is in position across the lower die (Fig. 72) with its ends in the guide notches 207', 208', the upper die, by means of the operating mechanism above described, is brought down to perform the initial forming operation in the first step in forming the clip. An air hammer 228 is now operated to complete this first step. This air hammer which may be of usual or well known construction, is supplied with compressed air through a pipe 229, which, as shown in Fig. 1, may connect with the pipe 44 supplying air pressure to the motor F. The valve of the air hammer is opened by means of a lever 230 connected through a link 231 to a spring pressed plunger 232 to the lower end of which is secured a nose or projection 233 in the path of a lug 234 carried by the shaft P'. After the punch die 211 has been brought down through the operation of the cam 226, as above described, the lug 234 engages the nose 233, pulling it downward and opening the valve of the air hammer. The latter gives several strokes to the die, thereby completing the first step in forming the clip. The lost motion connection between the die and the member 212 permits this action of the air hammer. It may be noted that the mechanical connections for operating the die, by means of the cam 226, are so adjusted that the die is not carried thereby to its lowest position. In other words, it remains for the air hammer to complete the initial step in forming the clip.

The means for ejecting the partially formed clip or moving it in position for the final forming process is shown in Figs. 57, 65, and 66. Such means comprises an ejecting plunger 235 adapted to reciprocate horizontally in a bearing 236. The forward end of the plunger works in the V-shaped groove 206 of the lower die, and is shaped to conform to said groove. The plunger is provided with a slot 237 to straddle the pin 210 and prevent interference therewith. On the front end of the plunger are holding pins 238 which engage and hold the clip while the plunger is being lifted after the air hammer has operated. The notches 227 in the die 211 permit said pins to be moved over the clip before the die has been retracted. The plunger 235 is connected through a link 239, to a rock arm 240 secured to a rock shaft 241. A second rock arm 242 fixed to the rock shaft 241 carries a roller 243 in engagement with the cam 244 on the shaft P'. The cam 244 has a low rise 244$^a$ and a high rise 244$^b$. During the forming operation, the ejecting plunger is retracted. After the air hammer has operated, the low rise 244$^a$ of the cam engages the roller 243 and operates to move the plunger forward until the pins 238 engage the clip. The upper die is then lifted. The high rise 244$^b$ of the cam now operates to complete the forward movement of the ejector plunger and push the clip into the end of a guide 245. The roller 243 rides off the cam and permits a coil spring 246 to retract the plunger before the die is again operated. The clip is completed by the succeeding operation of the die. That is, when the die 211 is again brought down the inclined faces 211' of the form 211$^b$ engage the ends of the clip and bend them inward. The clip is now complete and ready to be carried to the winding chuck.

The clips are fed from the forming dies by means of pawl and ratchet mechanism (Figs. 57 and 68) to a feed shaft 247 which is formed with a spiral or helical groove 248. On the shaft 247 is a gear pinion 249 in mesh with an idler gear 250 which in turn meshes with a gear 251 secured to a shaft 252. The gear 251 meshes with the gear 151 on the shaft P. The gear 249 is one-half the diameter of the gear 151, so that the spiral feed shaft makes two rotations for each rotation of the shaft P while the clutch Q' is closed. The clip feeding mechanism shown in Fig. 68 comprises a rock arm 253 secured to a rock shaft 254. The rock arm 253 is given a step-by-step outward movement by means of the pawl and ratchet mechanism as will be presently described. Said rock arm is then carried inward by means of the cam $C^3$ (Figs. 2 and 5) and the following connections: The rock shaft 254 at its left hand end (Fig. 1) is journaled in the bearing bracket 255. A depending arm 256 secured to the shaft 254 is pivotally connected to a rearwardly extending connecting rod 257 (Fig. 19). The rear end of the rod 257 is connected to an arm 258 secured to the end of the shaft 154. The forward end of the rock shaft 154 carries an arm 259 (Fig. 5) provided with a cam-engaging roller 260 in contact with the cam $C^8$. As the cam shaft C rotates the cam $C^8$ swings the arm 259 rearwardly, and through the connections just described carries the rock arm 253 (Fig. 68) inwardly to the position shown in Fig. 57. The upper end of the arm 253 is formed with an arc-shaped head 253' to which is secured by means of screws 261 an upwardly extending curved arm 262. Also secured to the arm 253 is a segmental ratchet bar 263, formed with ratchet teeth 263'. Loosely journaled on the shaft 254 behind the arm 253 is an upwardly extending arm 264. A coil spring 265 tends to swing the arm 264 to the left or toward a vertical position. On the upper end of the arm 264 is a roller 266 in the path of a cam 267 secured to the shaft 247. The arm 264 carries a pawl 268 which coöperates with the ratchet teeth 263'. A locking pawl 269 mounted on a stationary pivot is adapted to engage a notch 270 in the pawl 268 and hold the latter out of contact with the ratchet teeth. The pawl 269 is provided with a depending arm 271, the lower end of which is adapted to enter a notch formed in the head of a holding bolt 272. The latter is yieldingly held in contact with the arm 271 by means of a spring 273. A stop 274 carried by the ratchet bar 263 engages the arm 271 and lifts the pawl 269 into locking position as the ratchet bar reaches its forward point of movement. The bolt 272 holds the pawls up while the cam $C^3$ swings the ratchet bar inward. The arm 264 carries a stop 275 for the pawl 268.

The guiding block 245 which extends beneath the forming die to receive the clips as already described, is adapted to have a number of clips forced onto it by the plunger 235 while the ratchet feeding device is in the position shown in Fig. 68. The guide 245 comprises an under section 245' which conforms in shape to the clips, and an upper T-shaped section 245'' which forms a guide for a feeding block 276. The latter is connected through a link 277 to the arm 262. The block 276 carries a depending bracket 278 to the lower end of which is connected a pawl 279. A coil spring 280 holds said pawl yieldingly in contact with the arm 245, the pawl being notched to correspond with the shape of the guide arm. The upper end of the guide arm 245 is preferably connected, by means of a leaf spring 281, to a stationary support or bracket 282, so that the lower end of the arm 245 is held with a yielding pressure against the lower die 205. At the upper end of the section 245'' is a guide plate 283 which deflects the clips onto a trough-shaped guide 284 located over the spiral feed shaft.

The pawl and ratchet feed mechanism operates as follows: When the rock arm 253 is carried inward by the operation of the cam C⁵, a block 285' carried by the ratchet bar engages the arm 271 of the locking pawl and releases it, permitting the pawls to drop into engagement with the ratchet teeth. The inward movement of the arm 253 carries the feed block 276 downward toward the dies, the pawl 279 during such movement riding over the clips on the guide arm 245. As the spiral feed shaft rotates, the cam 267 engages the roller 266, swings the arm 264 outward, and through the pawl 268 and ratchet, moves the latter outward the distance of one tooth. The stationary pawl 269 prevents the return of the arm 264. During this movement, the feeding pawl 279 is engaged behind a series of clips and carries them upward along the guide 245, carrying one clip off the said arm onto the guide 284 (Fig. 70). Each succeeding rotation of the shaft 247 moves the arm 262 outward one step, and deposits a clip on the spiral guide until finally the stop 274 engages the locking pawl and lifts the latter into the position shown in Fig. 68, the pawls being thus held out of engagement with the rack and the arm 264 locked out of the path of the cam 267. The clips when they are deposited on the guide 284 are in position to be engaged by the spiral feed 247 and carried rearward between the inclined guides 285 and 286. A guide bar 287 and rod 288 located just above the spiral feed and extending substantially the length thereof, serve to guide the clips as they are fed rearwardly. The left hand end of the guide bar 287 (see Fig. 52) is connected to and supported by a plate 289 secured on the frame work. A spring arm 290 is connected by screws 291 to the bar 287. The clips pass beneath this arm during their final travel along the spiral. From the spiral the clips are fed along a transverse arm 292 connected by screws 293 to the plate 289 (see Figs. 52, 53, 59). Secured to the arm 292 by means of a screw 294, is a sheet metal guide frame 295 comprising spring arms 295ᵃ, 295ᵇ, which meet at their outer ends as shown in Fig. 60. These arms are cut away at their forward ends to form a V-shaped notch 296 (Fig. 60). The frame 295 also carries an integral spring tongue 297 which bears on the head of a pin 298 (Fig. 53) extending loosely through the guide arm 292. The end convolution 248' of the spiral groove 248 is in a plane perpendicular to the axis of the shaft. The shaft 247 carries a finger 299 in this end groove which, as the shaft rotates, is adapted to force the clips off the spiral onto the guide arm 292. The latter is provided with a slot 300 to permit the passage of the finger 299. The shaft 252 (Fig. 52) carries two cam disks 301 and 302. A rock arm 303 journaled on a stud shaft 304 (Fig. 54), is connected to an adjustable link 305, the end of which carries a yoke 306 straddling the shaft 252. A pin 307 carried by said yoke travels in a cam slot 301' in the cam disk 301. Connected to rock with the arm 303 is an arm 308 on the end of which is a holder 309 shaped to receive a clip from the guide arm 292, as will presently be described. A shaft 310 (see Figs. 52, 53, 56) has journaled thereon a sleeve carrying a rock arm 311 connected to a rod 312. The latter carries a roller working in the cam slot in the disk 302, the construction being substantially the same as that shown in Fig. 54. A depending rock arm 313, formed on the same sleeve as the arm 311, carries a pawl 314, yieldingly held up against the under face of the guide arm 292. As the shaft 252 rotates the pawl 314 is reciprocated and forces the clips forward along the arm 292. The pin 298 yields in an upward direction to permit the clips to pass and then engages behind the clips to prevent their being carried back with the pawl 314. Located above the guide arm 292 is a wheel 315 loose on a shaft 316. On opposite sides of the wheel 315 are spring-pressed plates 317 keyed to the shaft and formed with bosses 318 bearing against the wheel 315. The wheel 315 is provided with grooves 319 which guide the strands of wire being fed to the winding chuck. During each rotation of the shaft 252 (Fig. 52) the arm 308 is carried upward and the holder 309 on the end of said arm engages a clip in the end of the spring frame 295. As the holder moves into position to receive the clip, a pin 320 on the arm 308 (Fig. 60) enters the notch 296 and spreads the ends of the frame 295. The continued upward movement of the holder 309 places the clip on the wheel 315 where it is held by the spring plates 317.

The wheel 315 is fed forward to receive the clip by the following mechanism: (see Figs. 52 and 56). On the end of the shaft 252 is a crank 321 to which is connected a rod 322, the upper end of which is pivoted to a rock arm 323 loosely journaled on the shaft 316. A ratchet disk 324 fixed to the shaft 316 is formed with notches 325 to receive the end of a pawl 326 which is pivoted on the arm 323. A locking arm 327 journaled on the shaft 310 carries a lug 328 adapted to enter the notches 325 and lock the disk against rotation. A coil spring 329 holds the locking arm against the disk. On the outer end of said arm is a roller 330 in the path of the arm 323. Each rotation of the shaft 252 causes a reciprocation of the arm 323. As said arm moves upward it strikes the roller 330, moves the locking arm 327 out of locking position, the pawl engages a notch 325, and during the downward movement of the arm 323 the disk is rotated until the locking lug 328 engages the next succeeding notch 325. A step-by-step rotation is thus imparted to the clip holding wheel 318.

The coil as already noted is preferably wound from two strands of wire. These wires 331 are carried over the guide roller 315 already described and a second roller 332, said rollers being located on opposite ends of a swinging frame 333. (See Figs. 19, 31, 49, 73, etc.). Said frame swings about the shaft 316 as a pivot. The frame is supported and adapted to be swung upward to a substantially horizontal position by a rock arm 334 carrying a roller 335 in contact with the frame. The arm 334 is clamped to the outer end of the hollow shaft 155 (Fig. 51). The inner end of said shaft carries an arm 336 provided with a cam-engaging roller 337 coöperating with the cam C⁵. The frame 333 is held in its lifted position while the clips are being fed onto the winding chuck. The strands of wire 331 extend first over a grooved guide roller 338 to the wheel 315 and from thence to the guide roller 332, around the same and back to the under surface of the wheel 315, and around the same to the upper side thereof, and from thence to the winding chuck. In other words the strands make a complete loop around the guide pulleys 315, and 332. It will be understood that as the clips are carried onto the wheel 315, the open ends of the clips are extended upward or toward the axis of the wheel. The clip therefore straddles the two strands of wire. The relative position of the wires and clip is shown in Fig. 23. As the clips are carried upward with the wheel 315 as the latter rotates, they are of course inverted. The two entering strands of wire now engage the upper faces of the clip which is thus held between the inner and outer strands as shown in Fig. 23. The clips as thus held by the wire are carried thereon to the winding chuck. A frame 339 mounted on a shaft 340 in the end of the frame 333 carries on its forward end a pair of roller disks 341 having beveled jaws adapted to enter between the wheel 315 and the spring plates 317. In this way the upper portion of said plates are spaced to release the clips and permit them to be carried to the winding chuck. A set screw 342 permits adjustment of the disks 340 and also forms a stop to hold the disks in operative position.

The mechanism for holding the ends of the wires on the winding chuck while the winding of a coil is started, is shown in Fig. 10 and Figs. 77 to 81, inclusive. A block 343 is mounted on the winding chuck and slidable radially thereon. A lever 344 is connected by a pivot 345 to the block 343 and carries a star wheel 346 comprising four radial arms. The lever 344 is formed with jaws 347 which coöperate with the arms of the star-wheel to form a clamp for the wires. The star wheel hub has a squared end 348 against which bears a leaf-spring 349. A coil spring 350 bears against the block 343 and holds said block together with the lever and star wheel in an outward position as shown in Figs. 78, 79, except when said parts are forced inwardly by the strands of wire. A coil spring 351 bearing against the lever 344 normally holds the star wheel against the winding chuck. Pivoted to the casing E is a lever 352 carrying the roller 353 which works in a cam slot 354 formed in a cam disk 355 secured to the end of the shaft D. Pivoted to the upper end of the lever 352 is a rod 356 provided at its forward end with a cam 357 adapted to coöperate with the lever 344. The rod 356 is guided by the ejector M being slidable freely in an opening formed in the ejector.

The operation of the wire holding mechanism just described is substantially as follows: While the coil is being wound on the chuck, the star wheel 346 is held by the wires in its inward position as shown in Fig. 77. During the final rotation of the winding chuck, the shaft D is rotated into position to carry the lever 352 outward, so that the cam 357 is moved into the path of the lever 344. As the winding of the coil is about completed, the lever 344 engages the cam 357 and is swung about its pivot 345, the star wheel being thus freed from the coil. The spring 350 now operates to carry the lever and star wheel radially outward to the position shown in Fig. 78. During this movement, as the lever rides downward along the cam 357, it is again permitted to be swung back by the spring 351 carrying the star wheel into position to be engaged by the wires 331. The pressure of the wires on the arm of the star wheel rotates the latter about its pivot so that the next arm of the star wheel engages beneath the wires 331 and clamps them against the jaws 347. The spring 349 completes the quarter turn of the star wheel, so that the strands of wire are firmly gripped. The shears 358 (Fig. 80) now operate to sever the wires, thereby completing the coil prior to the opening of the winding chuck and ejection of the coil. The ends of the wire for forming the next coil are now firmly held by the gripping device just described and carry the wire around the chuck during its first revolution. The continued rotation of the winding chuck causes the wire forming the second convolution to engage beneath the horizontal arm of the star wheel and force the latter inward to the position shown in Fig. 77, where it is held until again operated upon by the cam 357.

The shears for cutting the wire after the coil is completed are illustrated in Figs. 19, 20 and 21. The shears are carried by a bracket 359 bolted to the frame E. Pivoted to the outer end of said bracket is a lever 360 the upper end of which is formed with a shearing blade 361. The lower blade 358 is formed on an arm 362 connected by a pivot 363 to the arm 360. The coil spring 364 between the shearing arms holds the shearing jaws open. Pivoted to the lower end of the arm 362 is a rod 365 having a reduced portion 365' extending through an opening in the arm 360 and forming a shoulder 366 to limit the separation of the shearing arms. The inner end of the rod 365 is pivotally connected to a rock arm 367 secured to the lower end of a rock shaft 368. (See also Fig. 2). Secured to the upper end of the said rock shaft is an arm 369 carrying a roller 370, the latter being held by a spring 371 in engagement with the cam disk on which is formed the cam C'. In operation as the cam C' engages the roller 370, the rod 365 is pulled inward by means of the connections just described, carrying the shearing arms inward until the jaws 361, 358 embrace the wires 331. During this movement, the spring 364 holds the jaws open. As the cutter is thus brought to cutting position, a stop 372 carried by the arm 360 engages the bracket 359 and holds the arm 360 stationary. The continued pull on the rod 365 now operates the shears to sever the wires. The stop 372 is adjustable to vary the inward position of the shearing arms.

Fig. 22 shows a modification in which an electromagnet is employed to operate the wire cutter. In this construction the move- ment of the arm 360' is limited by stops 373 and 374. A coil spring 375 holds the cutter in its retracted position. An electromagnet 376 is adapted to be energized by current from a battery 377 or other suitable source of power. The core 378 of the magnet is connected through a link 379 to the shearing arm 362'. A cam C'' is adapted to engage a roller 380 on a switch lever 381, and operate the latter to close the circuit for the electromagnet. The magnet being energized, it draws its core inward, thereby swinging the cutting jaws into position to sever the wires 331. The arm 360' is now against the stop 374 and the final inward movement of the magnet core operates the jaws to sever the wires.

The circular coil (Fig. 74) after it leaves the winding chuck is bent into a substantially U-shaped form, as shown in Figs. 76, Fig. 75 showing an intermediate step in the bending operation. The coil bending mechanism is operated by means of an air motor T (see Figs. 1, 34, 35 and 46 to 48). Compressed air for operating this motor may be supplied through a pipe or flexible tube 382, which, as shown in Fig. 1, is connected to the pipe 229 leading from the main supply pipe 44. The motor valves are controlled by the cam C² (Figs. 2 and 3). Said cam operates a rock arm 383 extending upward from a sleeve 384 journaled on the shaft 104. An arm 385 extending downward from said sleeve (see Fig. 1) is connected through a rod 386 to a crank arm 387. The connection between the rod 386 and the arm 387 is adjustable, as shown in Fig. 46, to adjust the throw of the motor valves. The air motor T is supported in a bracket 388 bolted to the under side of the platform 186. The motor is connected to the bracket 388 by means of a pivot pin 389 journaled in one arm of the bracket and a rod 390, having a screw-threaded connection with the motor, said rod being journaled in a bearing sleeve 391 which carries the arm 387. The bearing sleeve 391 is in turn journaled in the arm of the bracket 388. This connection permits the slight oscillation of the motor T which takes place during its operation and also permits independent movement of the sleeve 3.)1. Fixed to the motor casing is a laterally extending arm 392 to which is connected, by means of a screw 393, a caliper shaped spring comprising upper and lower spring arms 394 and 395, respectively. A collar 396 clamped to the sleeve 391 is formed with a lug 397 extending between the ends of the caliper springs. Upper and lower piston valves 398 and 399 are movable up and down in the valve chambers 398' and 399', respectively. Air passages 400 and 401 lead from the upper and lower ends of the motor cylinder, respectively, to the valve chambers. Passages 402 and 403, respectively, lead from the upper and lower valve chambers to the hollow shaft 390 and communicate through the latter with the supply pipe 382. The outer end of each valve has a passage 407 extending therethrough (Fig. 48) from a reduced section 408 of the valve. Within the motor cylinder 404 is a piston 405 and piston rod 406 connected to the coil bending mechanism. When the motor piston is in its lowest position, and the valves in their normal intermediate position, as shown in Fig. 46, the pressure supply to the motor cylinder is cut off by the outer ends of the valves. The ends of the motor cylinder are each in communication with the atmosphere. When the cam C² operates to rotate the sleeve 391 (Fig. 46), by means of the connections already described, the lug 397 (Fig. 47) forces the spring 395 and the lower valve 399 downward, thereby closing the port 409, cutting off communication between the atmosphere and the lower end of the motor cylinder, at the same time pressure is admitted through the passages 403, 407 and 401 to the motor cylinder beneath the piston. The piston now moves upward and operates the bending mechanism as hereinafter described. To operate the bending mechanism in the reverse direction, or in other words, to return it to its initial position, the arm 387 is returned to starting position to recenter the lower valve and carried beyond its central position to operate the upper spring 394 and lift the upper valve, thereby supplying pressure above the piston and forcing it downward to starting position.

The coil bending mechanism is illustrated in detail in Figs. 31 to 45, inclusive. Said mechanism in general comprises a main frame V which is normally slightly inclined in a rearward direction, but which is adapted to swing about a pivot 410 to a substantially vertical position as indicated by dotted lines in Fig. 34A. The main frame V carries the bending form comprising bending frames *e* and *e'*. The coil when transferred from the winding chuck is placed on four coil holding pins *a* and *b*. The bending frames *e* and *e'* are adapted to swing about the pins *b* as axes, thereby carrying the holding pins *a* from a position directly above the pins *b* as shown in Fig. 35A to a position directly beneath the pins *b* as shown in Fig. 35. The coil is placed on the pins while in the position shown in Fig. 35. As the pins *a* swing outward into a horizontal line with the pins *b*, the coil is stretched into a substantially straight loop as shown in Fig. 75. As the pins *a* continue their upward movement, the bending of the coil into the final form shown in Fig. 76 is completed. The completed coil before it is removed from the bending form, is indicated by broken lines in Fig. 35A. As the coil is completed, a pair of arms *e* carrying gripping jaws on their lower ends, are swung inward and grip the coil and are then swung and deposit the coil on a discharge platform.

The coil bending apparatus will now be described in detail. The main frame V is connected by the horizontal pivot rod 410 to a bracket 411 mounted on the platform 186. Said frame comprises a member 412 formed with a horizontal sleeve mounted on the pivot 410 and inclined sleeves 413. Above the member 412 is a horizontally extending casing 414 having depending stems 415 clamped in the sleeves 413 by means of bolts 416. The casting 414 forms a base or support on which the bending frames are adjustably mounted. Between the stems 415 is a yoke 417 which rests on the sleeves 413 and is held against lateral displacement by the stems 415. Threaded in said yoke is an adjusting bolt 418 which bears against the base 414. After loosening the clamping bolts 416 the adjusting bolt 418 will be rotated to adjust the bending mechanism to any desired height, the clamping bolts being then tightened to hold the parts in adjusted position. A horizontal shaft 419 has a central bearing in the base 414 or an extension thereof. Said shaft also has bearings in casings 420 which are adjustable longitudinally of the base 414. Located in each casing 420 is a gear wheel 421 formed with spiral or diagonal gear teeth. Said gear wheels are splined on the shaft 419 so as to be adjustable longitudinally thereof with the casings, but are held against rotation independently of said shaft. Said gear wheels and casings are adjusted by the following means: Extending longitudinally through the base member 414 is a screw rod 422 provided with right and left hand screw threads. Said rod has bearings in the end caps or plates 423 secured by screws 424. A hand crank 425 is secured to one end of the screw shaft. Clamping members 426 (see Figs. 38, 39) extend downward from the casings 420 and are adjustable relatively thereto to clamp said casings to the base member 414. Said clamps 426 have a screw-threaded connection with the adjusting rod 422. Formed on each casing 420 are lugs 427 in which is journaled a rock shaft 428 carrying a cam 429 which works in a squared opening 430 formed in the upper end of the clamping member 426. Each clamp 426 is formed with shoulders 430' which engage beneath the flanges formed on the base member 414. The rock shaft carries a handle 431. When the latter is swung downward, the cam 429 is carried down and releases the clamps 426. The screw rod 422 may now be rotated by means of the handle 425 to adjust the bending frames either inward or outward, thereby adapting them to coils of different sizes. When properly adjusted the locking levers 431 are moved to an upward position, the cams 429 thereby operating the clamps to lock the frames in adjusted position. Keyed to the center of the shaft 419 is a gear wheel 432 through which power is supplied for operating said shaft. This gear wheel is covered by a cap 433. Located above the shaft 419 and extending at right angles thereto are shafts 434 which carry the bending frames $v$. The bending frames with their operating mechanism are substantially alike, except that they are made right and left handed, so that a description of one will suffice for both. Each shaft 434 has keyed thereto a gear wheel 435 in mesh with a gear wheel 421 on the shaft 419. The gearing 435 is housed in the casing 436 which as shown is formed integral with the casing 420. The frame $v$ comprises a vertical rod 437 rigidly secured to the shaft 434 so as to rotate therewith. Fixed to the upper end of the rod 437 is a head 438. A rod 439 parallel with the rod 437 has a slidable connection with the head 438 and is adapted to be reciprocated by means of its connection with a cam disk 440 as more fully set forth hereinafter. A yoke 441 adjustable longitudinally of the rod 437 is clamped to said rod by means of a clamp bolt 442. A screw-threaded adjusting rod 443 is journaled in the head 438 and has a threaded connection with the yoke 441, so that when the clamping nut is loosened said yoke may be adjusted to any desired position. The yoke 441 carries one of the coil holding pins $a$. Pivoted to said yoke is a locking plate 444 provided with a slot 445 which the holding pin $a$ enters when the locking plate is swung down to a locking position. The locking plate is fixed to a short pivot pin 446, the opposite end of which carries a short crank arm 447 shown in dotted lines in Fig. 38. Adjustably secured to the rod 439 by means of a clamping bolt 448 is a collar 449. A link 450 is pivoted at its upper end to said collar and its lower hooked end engages the rounded end of the crank arm 447. It will be seen that with the connections just described the locking plate 444 will be swung downward to locking position when the rod 439 is moved downward through the yoke 441.

The cam disk 440 (Figs. 38, 39 and 41) is held against rotation relative to the gear inclosing casing 420. In the front face of said cam are three cam grooves 451, 452 and 453, in which travel cam rollers 454 and 455, carried by the rod 439. Referring to Fig. 43, it will be seen that the roller 454 is carried by a sleeve 456 slidable longitudinally on the rod. Within said sleeve is a coil spring 457 bearing at its upper and lower ends respectively against collars 458 and 459, said collars being also slidable along a reduced portion of the rod 439 but held against shoulders formed on said rod when the sleeve is in its intermediate position as shown. The roller 455 travels in the outer cam groove 451. The roller 454 travels in the innermost cam groove 453 as the arm $v$ swings outward and downward from the position shown in Fig. 38. During the return movement, the roller 454 travels in the intermediate groove 452. More specifically, the operation of the rod 439 and locking plate 444 is as follows: As the bending frame $v$ rotates with the shaft 434, in a clockwise direction from its vertical position (Fig. 38), the roller 454 travels upward in the cam groove 453 concentric with the shaft so that the rod 439 is not moved relatively to the yoke 441. During this movement, the roller 455 traveling in the eccentric groove 451 is drawn outwardly away from the roller 454 thereby compressing the spring 457. As the frame $v$ approaches the limit of its downward travel a coil is placed on the holding pins $a$ and $b$. Directly thereafter the roller 454 reaches the end of the slot 453 and, owing to the spring 457 being under tension, is pulled upward into the intermediate cam groove 452. In other words the rod 439 is drawn inward, and through the connections already described, swings the locking plate 444 inward to engage the pin $a$ and hold the coil while the bending operation takes place. During the return movement of the bending frame, the cam roller 454 travels downward along the intermediate groove 452, thereby holding the locking plate closed. During this movement the roller 455, traveling in the eccentric groove 451, is forced toward the roller 454 again placing the spring 457 under tension, so that as the bending frame nears its vertical position, the rod 439 is again forced outward, carrying the roller 454 into the inner cam groove 453, the parts once more assuming their initial relative position.

The shaft 434 of the bending frame is made hollow or provided with a longitudinal bore $b'$ through which the coil-holding pin $b$ extends. The holding pins $b$ are adapted to be reciprocated in said hollow shaft, as more fully described later, and while the coil is on the bending frames, the pins $b$ protrude beyond the face plate 460 of the bending frame. Locking plates 461, corresponding in function to the locking plates 444, coöperate with the holding pins $b$.

The mechanism for controlling and operating the plates 461 will now be described. Such mechanism will be understood by reference to Figs. 38, 39, 40 and 42. Secured to the rear end of the shaft 434 is a disk 462 on the hub of which is freely mounted an upwardly extending arm 463. Said arm may be secured in position by means of a cap plate 464 secured by screws 465 to the disk. A pawl 466 is pivoted in the bifurcated end of the arm 463. The lower end of said pawl extends through an opening in said arm and bears against the disk 462, a spring 467 being employed to hold the pawl in such position. The upper end of the casing 436 (Fig. 39) is formed with a sleeve 468 through which extends a rock shaft 469. Secured to the forward end of said shaft is an arm 470, the outer end of which carries a clamp 471. The locking plate 461 is adjustably held by said clamp. Secured to the rear end of the shaft 469 is a bell crank lever 472 which carries a roller 473. Said roller works in a slotted end of the arm 463. In operation, as the frame $v$ is rotated toward its downward position, the disk 462, as viewed in Fig. 40, rotates in a counter-clockwise direction. As it approaches its limit of movement in this direction, a notch 474, formed in the outer face of the disk, rides under the pawl 466, thereby locking the arm 463 to the disk. As the bending frame starts on its return movement, the disk carries with it the arm 463, which, being in engagement with the roller 473, swings the bell-crank lever 472 about its axis until a roller 475, at the outer end of said lever, is carried inward into position to engage behind a segmental flange 476 formed on the inner face of the disk 462. The bell crank lever being thus swung inward, rotates the shaft 469, and swings the locking plate 461 inward to straddle the coil holding pin $b$. It will be understood that when the locking plate is thus swung inward, the holding pins $b$ have been projected and a coil placed thereon. As the bell-crank lever reaches its inner position, a pin 477 on the pawl is engaged by the roller 473 and the pawl thereby released from the notch 474, thus permitting the disk to complete its return movement. The roller 475 being held behind the flange 476, during such movement, the locking plate 461 is held in its inward position. As the bending frame has about completed its return movement, the cam 476 passes beyond the roller 475, and a lug 478, carried by the disk 462, strikes a pin 479 on the bell-crank lever and returns the latter to its initial position. The disk 462 carries a pin 480, which, as the bending frame nears its downward position, strikes the arm 463, and insures the parts being held in proper position after the pawl is released.

Referring to Figs. 31, 34ᴬ, 44 and 45, a column 481, which, as shown, is made hollow, is mounted on the base 186. Formed on the lower portion of said column are brackets 482 provided with slots 483 concentric with a shaft 484 supported in said column. A bracket 485 is pivotally supported at its rear end on the shaft 484, and at its forward end carries stud bolts 486 which extend through the arc-shaped slots 483. Said stud bolts are threaded to receive locking nuts 487 for holding the bracket 485 clamped in any desired position of adjustment. The bending form V carries a shaft 488 on which is mounted a segmental gear 489 adapted to mesh with the gear 432. The gear 489 has formed integral therewith arms 490 which extend forward and engage beneath rollers 491 on the bracket 485. The bending form V normally rests against the bracket 485, and the arms 490 extending beneath the rollers 491, hold it in such position. The inner faces of the arms 490 are concentric with the shaft 488. Journaled on the shaft 488 are upwardly extending arms 492, the upper ends of which are slotted to receive a shaft 493 to which are secured the coil holding pins $b$, the latter extending forwardly through the hollow shafts 434. A tension spring 494 is secured at one end to the shaft 493, and at its opposite end to the cap 433. The arms 492 are provided with lugs 495 which engage behind lugs 496 formed on the gear member 489. The piston rod 406 of the air motor T is connected by a pivot 496′ to the gear member 489. Pivotally connected to the upper end of the piston rod is an extension rod 497 adapted to operate the mechanism for removing the finished coils from the bending frame.

When the air motor T is operated, the initial upward movement of the piston rod operates the mechanism for removing the coil from the bending frame. During this initial movement, the gear 432 (Fig. 44) is locked against rotation by the gear 489. The gear teeth on the gear 489 now engage the gear teeth of the gear 432 to rotate the latter. The shaft 419 being thus operated operates through the spiral gears 421, 435 to rotate the bending frames as already described. As the bending frames near their downward position, the arms 490 ride out from beneath the rollers 491, thereby releasing the frame V. At the same time the lugs 496 engage said frame so that the continued upward movement of the piston rod 406 swings the frame V about its pivot 410 to the vertical position indicated by the dotted lines in Fig. 34ᴬ.

The mechanism for transferring the coils from the bending form will next be described: Mounted on the column 481 is a bracket 498 in which is journaled a transverse rock shaft 499. A pinion 500 fixed to said shaft meshes with rack teeth 501 formed on the rod 497. The rack and pinion are held in engagement by means of a guide 502 pivotally connected to the shaft. Journaled on the shaft 499 are swinging brackets 503 which carry the coil-ejecting arms $c$. Each arm $c$ (see Fig. 32) comprises a rod 504 secured to an elbow 505, which in turn is fixed to a shaft 506. The latter is journaled in the swinging bracket 503. The arm c carries at its lower end a pair of coil gripping jaws 507, 508 (see Figs. 32, 33). The jaw 507 is clamped to the rod 504. The jaw 508 is loosely mounted on said rod. The collar 509 clamped to the rod 504 carries a leaf spring 510 bearing against a lug 511 formed on the movable jaw 508, thereby tending to hold the jaws closed. A sleeve 512 rotatably mounted on the upper portion of the rod 504 telescopes with a sleeve 513, the lower end of which carries a finger 514 extending downward between the jaws. The telescoping sleeves are adapted to rotate together as a unit. Secured to the upper end of the sleeve 512 is an arm 515 carrying a roller 516 adapted to coöperate with a cam 517 formed on the front face of the bracket 503. Fixed to the rod 506 is a depending arm 518, at the lower end of which is a cam engaging roller 519 (see Fig. 37) coöperating with a cam 520. Said cam is formed on a cam disk 521 keyed to the shaft 499. A coil spring 522 (Fig. 34$^A$) is connected at one end to the bracket 503, and at the opposite end of the arm 518, thereby holding the latter in engagement with the cam disk.

In operation, when the rack bar is moved upward the shaft 499 is rotated, carrying with it cam disks 521. The cams 520 therefore engage the cam rollers 519, and rotate the rock shafts 506, thereby swinging the arms c inward from the position shown in Fig. 35$^A$. As said arms swing inward, the cams 517 hold the coil gripping jaws open, but as the arms reach their inward position, the cam roller 515 rides off the cam 517 permitting the spring 510 to close the jaws, thereby gripping the coil. As the shaft 499 continues to rotate, a lug 523 on the cam disk 521 contacts with the bracket 503 the lugs 496 by this time engaging the frame V as already described, and the frame V and the apparatus carried thereby, including the arms c and the coil held thereby, are swung backward to the position indicated in dotted lines in Fig. 34$^A$. When the shaft 499 is rotated in the reverse direction, the cam 520 again engages the roller 519 and opens the clamping jaws, thereby releasing the coil and depositing it on the discharge chute 524. As the shaft 499 continues its return movement, a lug 525 on the disk 521, engages behind the bracket 503 and swings it forward to the starting position.

Certain features in connection with the gear mechanism within the casing E, and various devices controlled by said mechanism, will now be described to permit a clear understanding of the relation and coöperation of the several elements of said mechanism. The gear wheel 9 is adapted to be locked during certain portions of the operation by the following means: Referring to Figs. 2 and 4, a sleeve 526, mounted on the rock shaft 15, carries an upwardly extending arm 527 on the upper end of which is a roller 528 which coöperates with the cam C$^4$. The sleeve 526 is also provided with a depending arm 529, connected through a link 530 (see Figs. 1 and 7) to a rock arm 531 (see Fig. 3) sleeved on the shaft 104. Integral with the arm 531 and extending upward above the shaft 104 is an arm 532 formed on its upper end with a head 533 movable into and out of the path of stops 534 secured to the gear wheel 9. As the roller 528 enters a recess of the cam C$^4$, the stop 533 is moved into position to lock the gear 9 against rotation. The means for operating the cam 70 (Fig. 12) into position to effect the closing of the clips is as follows: The cam 70 is carried at the outer end of a rock shaft 535 (Fig. 10), journaled in the casing. On the inner end of said rock shaft is an arm 536 provided with a roller which bears on a cam disk 537. Said disk is splined on the shaft D so as to be movable longitudinally thereof and carries a cam 538 movable into and out of line with the roller on the arm 536. The cam disk 537 is shifted by means of a lever 539 (see Fig. 3), the upper end of which is formed with a yoke connected with the hub of the cam disk. The lever 539 extends below the shaft 104 and is connected to a rod 540 (see Figs. 7 and 4) which extends forward and is connected with a rock arm 541 secured to the rock shaft 15. When the main clutch is moved to the left for the slow operation of the winding chuck, the rock shaft 15 is in position to hold the cam disk 537 through the connections just described to the left (Fig. 10) with the cam 538 out of the path of the lever 536. When the main clutch is thrown to the right for the fast rotation of the winding chuck, the cam 538 is moved to the right, and during the fast winding the shaft D is slowly rotated by means of the Geneva gearing and the cam 538 is brought around into position to operate the clip closing cam 70 during the final rotation of the winding chuck.

A locking device to lock the gear 10 and connected train of gears while the main clutch is thrown to the right, is provided as follows: Referring to Figs. 2, 5 and 7, the locking lever 542 loosely mounted on the shaft D is adapted to engage a notch 543 in the hub of the gear wheel 85 and lock the same against rotation. The lever 542 extends below the shaft D and is provided with a cam surface 544. A roller 545 on the end of an arm 546 coöperates with said cam. The arm 546 is formed on a sleeve 547 having a fixed connection with the shaft 15. When the main clutch is thrown to the left, the lever 31 (Figs. 1 and 7) rocks the shaft 15 and swings the arm 546 downward, the roller 545 thereby swinging the locking lever 542 into released position, so that the gear 10 and connected train of gears are free to rotate. When the main clutch is thrown to the right, the roller 545 is carried out of engagement with the cam 544 and permits a spring 548, connected to the locking lever, to swing the latter into locking position.

Referring to Figs. 2 and 5, it will be seen that the cam $C^6$ which imparts the initial movement of the main clutch toward the right is formed on the end of an arm 549. Said arm is mounted to oscillate between stops 550 and 551 carried by the cam disk $C^7$. A coil spring 552 holds the said arm normally against the stop 551. As the cam disk $C^7$ is rotated in a clockwise direction, (Fig. 5), the cam $C^6$ is brought into engagement with the roller 20. As the disk $C^7$ continues to rotate, the stop pin 550 is brought against the arm 549 and positively operates the cam $C^6$ to impart an initial movement of the main clutch toward the right. As the throw of the clutch is completed the roller 20 frees the cam $C^6$ and permits the spring 552 to swing said arm upward against the stop 551, so that when the clutch is again thrown to the left, the cam $C^6$ is out of the path of the roller 20.

The disk 91 (Figs. 2 and 4) is provided with gear teeth $91^a$ adapted to mesh with gear teeth $72^a$ of the gear 72. The remainder of the periphery of the disk 91 is smooth and comprises a high section $91^b$ adapted to interlock, as shown, with the gear 72, and a low section $91^c$, which, when opposite the gear 72, permits the latter to rotate independently of the disk 91. Pivoted to the disk 91 is a pawl 553 provided with a tooth 554. The pawl is adapted to be moved into position to engage the gear teeth $72^a$. Said movement is effected by means of a roller 555 carried by the disk $D^2$, said roller striking the tail of the pawl to throw the tooth 554 outward as more fully described hereinafter. The disk 91 is loose on the shaft C and is driven by the cam disk $C^4$ secured to the shaft C. A lost motion connection between the disk 91 and the cam disk $C^4$ is provided, as indicated in Fig. 4, and comprises a stop arm 556 secured to the hub of the cam disk $C^4$ and working in the slot 557 in the hub of the disk 91. A coil spring 558 is connected at its opposite ends to the disk 91 and the arm 556, respectively.

A general statement of the operation of the gearing shown in Fig. 2, more particularly as it relates to the operation of the winding chuck, will now be given. The driving shaft A runs continuously. When the main clutch K is shifted to the left, the train of gearing 10, 85, 84, 86 and 87, operates to impart one complete rotation to the cam shaft C. The gear 87 and the cam disks $C^7$, $C^5$, and $C^4$, being fixed to the shaft, also make one complete rotation. The slow winding of the chuck takes place during this rotation. When the main clutch is shifted to the right for the fast winding the cam shaft remains stationary. It should be borne in mind that the gears 84 and 86 are loose on the shaft B, the gear 72 is fixed to said shaft and the gear 74 has a limited movement relative to the gear 72 to permit the opening and closing operation of the winding chuck. The ring gear 88 is free to rotate independently of the cam shaft C when driven by the gear 74, and also permits a limited independent movement of the shaft C as will presently appear. To trace the operation of the several gears, it will be assumed that the main clutch has just been thrown to the left for the slow speed movement. At this time the gear teeth $72^a$ and $91^a$ (Fig. 4) will be in mesh. The cam shaft C now starts to rotate, being driven by the train of gears at the left of the main clutch. The initial movement of said shaft takes up the lost motion between the cam disk $C^4$ and the disk 91. The disk 91 is then rotated and drives the shaft B until the gear 72 is locked by the high section $91^a$ of the disk 91. At this time the gear wheel 9 is locked by means of the locking arm 532, Fig. 3, so that the gear 74 is held stationary. The rotation of the gear 72 and shaft B, therefore operates the planetary gearing (Figs. 10 and 13) and opens the winding chuck as heretofore described. The opening of the winding chuck having taken place, the gear 72 is now locked by the disk 91 and the latter rotates until the high section 91 rides from beneath the disk 72. While this last movement is taking place, the lock for the gear wheel 9 is released. The pawls 89 (Fig. 3) of the ring gear are also brought up to the disk 90, or in other words, the disk 90 travels up to said pawls, so that the ring gear will be positively driven. The gear 74 is thus rotated while the gear 72 is still locked. Such rotation of the gear 74 relative to the gear 72 operates to close the winding chuck. It will be understood that between the opening and closing movement of the winding chuck, the ejector M has operated to remove the finished coil from the chuck. As the chuck closing operation is completed, the disk 91 is carried out of locking engagement with the gear 72, and the lost motion between the gears 74 and 72, Fig. 14, having been taken up, said gears are both driven together by the ring gear 88, and rotate as a unit during the remainder of the rotation of the shaft C. The slow turn of the winding chuck, during which a set of clips is placed in position on the chuck, takes place while the gears 72 and 74, together with the shaft B are thus rotated. When the disk 91 finishes its rotation, the pawl tooth 554 is directly opposite the gear 72, but is in its inward position out of locking engagement. The clutch K is now thrown to the right for the fast winding. During the fast speed winding, the Geneva gear operates to intermittently rotate the shaft D until the cam D³ is carried into engagement with the roller 21 to again throw the clutch to the left. As the cam D³ approaches such position, the roller 555 carried by the disk D² travels into position to engage the tail of the pawl 553, and swing the tooth 554 outward. The gear 72, which during the fast winding is rotating continuously, is now brought around, catches the tooth 554 and rotates the disk 91 through a short angle, such rotation being only sufficient to take up the lost motion between said disk and the cam C⁴. The gear teeth 72ª and 91ª are now in mesh ready for another rotation of the cam shaft C. At this juncture the cam D³ engages the roller 21, throws the clutch K to the left and the above described operation is repeated.

The adjusting shaft D is rotated in one direction during the fast speed winding, by means of the shaft B operating through the clutch O to drive the Geneva gear. During the slow speed, the shaft D is rotated in the reverse direction by means of the gears 142 and 87 (Fig. 6), as follows: The gear 142 is normally locked to the shaft D by means of the adjusting device shown in Fig. 7. Said gear is opposite the left hand portion of the gear 87, which is provided with a smooth section 87ª. At the time the main clutch is shifted to the left, the smooth portion 87ª of the gear 87 is opposite the teeth of the gear 142. As the gear 87 rotates in a clockwise direction (Fig. 6), its teeth are brought into mesh with the teeth of the gear 142 and rotate the latter until a mutilated portion 142ª of the gear 142 is brought opposite the gear 87. The gear 142 now remains at rest while the gear 87 completes its rotation. The smooth section 87ª is now opposite the gear 142 permitting the latter to rotate in the reverse direction during the fast winding. It will be understood that the gear 142 together with the shaft D only makes parts of a complete revolution. The distance it is rotated depends on the adjustment of the device in Fig. 7 for regulating the number of turns of the winding chuck. For example, if the shaft D is adjusted for a large number of turns, the cam D³ is carried around so that the Geneva gearing must rotate the shaft D and gear 142 through a comparatively large angle to bring the cam D³ into position to throw the clutch. During the slow turn the gear 87 will of course have to rotate the gear 142 through an equal angle in the reverse direction before the mutilated section 142ª permits the gear 87 to run free.

Figs. 82 to 92 inclusive, illustrate a modification of the mechanism for driving and controlling the coil-winding chuck. In this construction the pinion 4 on the pulley shaft 2 drives a gear wheel 560 secured to a shaft 561. A mutilated gear wheel 562 also fixed to the shaft 561, is adapted to alternately rotate mutilated gear pinions 563 and 564 located on opposite sides of the gear wheel 562. The latter is provided with a smooth surface 565 forming somewhat more than half of its periphery, which surface is adapted to interlock with the gear pinions 563 and 564. As the gear wheel 562 rotates in the direction indicated by the arrow, Fig. 90, the pinion 563 is given one complete rotation, as the number of gear teeth on the gear 562 and the pinion 563 is the same. Said pinion is then locked by the interlocking surfaces engaging, and held stationary while the gear wheel 562 continues to rotate and imparts a rotation to the pinion 564. It will thus be seen that during each rotation of the gear wheel 562 the coöperating pinions are given a complete rotation. The pinion 563 is keyed to a hollow shaft 566 journaled at one end in the casing E and near its opposite end in a bearing standard 567. Loosely mounted on the shaft 566 is a series of stepped gear wheels 568, 568ª, 568ᵇ, 568ᶜ, 568ᵈ, which intermesh respectively, with pinions 569, 569ª, 569ᵇ, 569ᶜ, 569ᵈ, secured to a shaft 570 located directly over the shaft 566 and journaled at its ends in the casing. Means are provided as presently described to connect any one of the stepped gears 568, etc., to its shaft, and thereby drive the shaft 570. Mounted on the latter is a gear wheel 571 which meshes with the gear wheel 74 on the winding shaft B.

The mechanism for connecting the stepped gears to their shaft is as follows:—Extending loosely through the hollow shaft 566 is a rod 572 adapted for longitudinal movement within the hollow shaft. Said rod carries a spring-pressed pawl or locking plate 573 which extends through a slot or key-way 574 formed in the hollow shaft. The stepped gear wheels 568, etc., are separated by spacing rings 575, and each of the said gear wheels is provided with a slot 576 to receive the projecting portion of the locking plate 573 and thereby lock the gear wheel to the hollow shaft. The locking plate 573 and spacing rings 575 are beveled so that as the rod 572 is moved longitudinally the locking plate will yield in an inward direction to pass the spacing rings.

The means for adjusting the rod 572 comprises a lever 577 pivoted at one end to a bracket arm 578, and at its opposite end having a slot and pin connection 579 with the said rod. A swivel 580 is provided to permit the rotation of the rod. A link 581 connects the lever 577 to a crank arm 582 secured to a stud shaft 583. The latter extends through a stationary disk 584 secured, by means of pins 585, to the casing. An adjusting lever 586 secured to the shaft 583 carries a locking pin 587 adapted to engage the graduated openings 588. By rotating the lever 586, the locking plate 573 is brought into engagement with any desired one of the stepped gears 568, etc. The number of turns given to the winding chuck during the formation of a coil is determined by the adjustment of these gears. The gear wheel 560 (Fig. 90), makes one complete rotation during the formation of each coil. The gear 568ᶜ being locked to its shaft, as shown in Fig. 85, makes one rotation, and as the ratio of the gears 568ᶜ and 569ᶜ is 3:1, the latter will make three rotations, and through the gears 571 and 74 will impart three rotations to the winding shaft B. It will be noted that the indicator Fig. 84 is set to indicate three rotations of the winding shaft.

The clip closing cam 70 is operated by means of a pair of cam disks 589 and 590, mounted side by side on the hollow shaft 566. The cam shaft 535 carries an arm 591 provided with a cam engaging roller 592 adapted to bear on the periphery of the two cam disks. The outer disk 589 is keyed to the hollow shaft. The disk 590 is loosely mounted on its shaft. A pin 593 threaded into the hub 590′ of the disk 590, extends through an arc-shaped slot 594 in the hollow shaft 566 (see Fig. 87) and engages in a helical groove 595 formed in the shaft 572. With this arrangement it will be apparent that when the shaft 572 is moved longitudinally, to adjust the locking plate 573 the disk 590 will be rotated relative to the disk 589. The purpose of this arrangement is to cause the clip closing cam 70 to operate at the proper time, that is, only during the final rotation of the winding chuck, regardless of the number of rotations for which the mechanism is set. For example, when driving through the gear 568ᶜ, as shown, it is necessary to operate the cam 70 comparatively early, as the winding shaft commences its final rotation comparatively early, that is, when the gear 568ᶜ has made about two-thirds of a complete rotation. The cam disk 590 is therefore so adjusted that at this time the roller 592 runs off the high part of the cam, permitting the coil spring 596 to move the cam 70 into operative position. If the shaft 572 is moved to the left to successively lock the gears 568ᵃ, 568ᵇ, and 568ᶜ, the cam disk 590 will be rotated to the dotted line positions 590ᵃ, 590ᵇ and 590ᶜ, respectively. In this last position, for example, the clip closing cam is only brought to operative position a comparatively short time before the hollow shaft completes its rotation, as the final rotation of the pinion 564 and consequently of the winding shaft, only takes place during the last portion, or more specifically the last one-sixth of the rotation of the shaft 566.

Referring to Figs. 82 and 90, the mutilated pinion 564 is mounted on a shaft 597 to which is also secured pinion 598 directly behind the pinion 564 as indicated in dotted lines Fig. 90. The pinion 598 is in mesh with the gear 599 on the cam shaft C. This shaft carries cams for controlling the various steps in the making of a coil as has been described in connection with Fig. 2. Said shaft is given one complete rotation while the pinion 563 is locked, and the train of gearing including the gear 74 is at rest. During such rotation of the cam shaft the mutilated gear 91 coöperates with the gear 72 on the winding shaft, to open the winding chuck in a manner hereinbefore described in connection with other figures. By reference to Fig. 88 it will be seen that the gear 571 is in the form of a ring gear driven through the pawl 600. This permits the backward rotation of the gear 74 required in the chuck closing operation.

Fig. 89 shows mechanism for controlling the clutch (Fig. 92) and the wire guiding frame 333. A bell crank lever 601 is secured to the hollow shaft 153 which carries the clutch releasing arm 152, Fig. 92. One arm of the bell crank lever carries a cam engaging roller 602 coöperating with a cam disk 603 secured to the shaft 570. The other arm of the bell-crank is formed at its upper end with a hook adapted to engage a latch 604 journaled on the shaft C. A disk 605 fixed to the cam shaft carries the stop 606 for the latch 604. A coil spring 607 connected at its upper and lower ends to the disk 605 and the latch 604 respectively, holds the latter yieldingly against said stop. During the first rotation of the shaft 570, the bell-crank 601 is in released position as shown, and the arm 152 (Fig. 92) is in its lifted position, so that the clutch Q″ is closed and the clip forming and carrying mechanism is operated to make and apply eight clips to the winding chuck. As the cam disk 603 completes its first rotation, the cam projection 603′ engages the roller 602 and swings the bell crank lever 601 into position to be engaged by the latch 604. This swings the arm 152 to release the clutch 119 and stop the clip mechanism. The bell-crank lever is now held in such position free from the disk 603 during the remaining rotations of the shaft 570. When the cam shaft C rotates, the latch 604 is carried with it, thereby releasing the bell crank 601, and permitting it to assume its original position. A coil spring 608 serves to return said bell-crank.

A second bell-crank lever 609 mounted on a pivot 610 and comprising a vertical and a horizontal arm, controls the operation of the wire guiding frame 333. The horizontal arm of said lever carries a roller 611 which coöperates with a cam disk 612 secured to the shaft 570. The arm 334 which is adapted to lift the frame 333 to a horizontal position, is secured to a rock shaft 613 (Fig. 89), to which is also secured an upwardly extending rock arm 614. A latch lever 615 is connected by a pivot 616 to the lever 609. The arm 614 is formed near its upper end with a nose adapted to be hooked over a pin 617 on the bell-crank lever 609 to lock that lever in the position shown. Secured to the shaft C is a cam 619, which, when the shaft is rotated, is brought into contact with a pin 620, carried by the arm 614, and swings the latter outward. This permits the latch 615 to drop or to be pulled downward by means of a spring 621 in front of the arm 614, and hold the latter outward. A pin 618 on the lever 609 limits the downward movement of said latch. The operation of this mechanism is as follows: After the first rotation of the shaft 570 the bell crank lever 609 is locked as shown. When the cam shaft C rotates, the cam 619 strikes the pin 620 and swings the arm 614 back, permitting the latch 615 to drop in front of said arm and hold it in such position. The wire guiding frame 333 is thus lifted and held in its horizontal position. During the first revolution of the shaft 570, the frame is thus held up, but as the first revolution is completed, the roller 611 moves upward into the cam notch 612'. This movement carries the latch 615 upward to release the arm 614 and permit the latter to swing inward beneath the latch. The lever 609 is again moved downward as the roller 611 rides out of the cam groove. The arm 614 will again engage the pin 617, and lock the parts in the position shown, the wire guiding frame being now in its downward position. The shaft P' (Fig. 85) for operating the clip feeding mechanism, is driven through a train of gearing from the shaft 570. This train comprises a gear wheel 622 secured to the shaft 570 meshing with a pinion 623 on a stud shaft 624. A gear wheel 625 rotating with the pinion 623 meshes with a pinion 626 on a shaft 627 journaled in the casing. The latter shaft is connected through a clutch Q'' and coupling Q to the shaft P'. The gears 622 and 623 have a ratio of 2:1, and the gears 625 and 626 have a ratio of 4:1. It will thus be seen that one rotation of the shaft 570 imparts eight rotations to the shaft P' as is necessary to form eight clips and to apply eight clips to each coil.

Fig. 93 shows a modified construction by which the coil bending mechanism is mechanically operated by power supplied through the cam shaft C, instead of being operated by an air motor controlled from said cam shaft. The lever 385 operated by the cam C² is connected, through a link 386', to one arm of a bell crank lever 628. The opposite arm of said lever is connected to and operates a rod 629 corresponding in function and operation to the piston rod of the air motor T.

A modified form of coil bending mechanism is illustrated in Figs. 94 to 100, inclusive. The mechanism in this instance is adapted to be swung bodily about a pivot 410 to and from a vertical position as shown in Fig. 95, and is also adjustable vertically by mechanism as set forth in connection with the form of apparatus already described. The gearing for operating the bending frames is contained within a casing 630 provided with a removable cover plate 631. Within the casing is a vertically disposed rack bar 632 to which is bolted a guide plate 633 (see Fig. 96). Guide strips 634 secured to the back of the casing form therewith a guide way for the plate 633 and rack bar. A lug 635 secured to or formed integral with the guide plate 633 extends through a slot 636 in the casing, and has pivoted thereto an operating rod 637. The latter may be operated by mechanism as shown in Fig. 93, the same as the rod 629, or by an air motor as in preceding structures. A rod 638 pivoted to the casing 630 for swinging the latter to a vertical position, may be conveniently operated by a cam on the cam shaft C and operating connections as shown in Fig. 93, or in any other suitable manner. The front face of the rack bar 632 is flanged to form a guide for a member 639 which carries gear pinions 640 in mesh with the rack bar. Gear wheels 641 in mesh with the pinions 640 are fixed to shafts 642. The latter are journaled in sleeves or hollow bolts 643 which extend through horizontal slots 644 in the casing. This arrangement permits the shafts 642 and with them the bending frames to be adjusted laterally to accommodate coils of different sizes. Clamping nuts 645 hold the shafts rigidly in position. Arms 646 each pivoted at its opposite ends to a shaft of a pinion 640 and gear wheel 641, respectively, hold said gears and pinions in mesh.

The forward end of each rock shaft 642 extends through a block 647, slidably mounted in a horizontal slot 648 in the front plate of the casing. The coil bending frame $w$ comprises a head 649 fixed to the front end of the shaft 642 and a pair of rods 650 connected at their outer ends by a yoke 651. A yoke 652 is slidably mounted on the rods 650 and adjustable by means of a screw rod 653 threaded through the yoke 652 and journaled in the yoke 651. The end of the shaft 642 may be reduced to form a coil holding pin $b'$. The yoke 652 also carries a coil holding pin $a'$. Locking plates 654 and 655 adapted to be swung over the pins $b'$ and $a'$, respectively, are secured to pivot pins journaled in the head 649 and yoke 652, respectively. Each of said pivot pins is provided with a rock shaft 656 said rock shafts being connected by an adjustable rod 657. Said rod carries a roller 658 which runs in contact with a cam surface formed on an arm 659. A clamping bolt 660 adjustable in a slot 661 formed in the cover plate 631 holds the cam arm in any position to which it may be adjusted.

A pin 662 adapted to form the inner bend of the coil, is carried by a rock arm 663 fixed to a rock shaft 664 journaled in the block 647. The shaft 664 is capable of a rocking movement to swing the pin 662 into and out of operating position as indicated in Figs. 97 and 98, and is also adapted to be moved in an axial direction to withdraw the pin 662 out of the plane of the coil or to project it into operating position. The means for projecting the pin 662 comprises a cam 665 secured to the shaft 642 and coöperating with a roller or projection 666 carried by the rock shaft 664. As the cam disk 665 is rotated in a counterclockwise direction, (Fig. 100), the high portion of the cam face engages the roller 666 and projects the rock shaft 664 carrying the pin 662 into the plane of the pins b', a'. The shaft 664 is locked in its forward position by a latch 667 mounted on a pivot pin 668. When the shaft 664 has been projected by the cam 665 the end of the latch 667 engages a groove 669 in the end of the shaft 664 and locks the latter. When the cam disk 665 is returned, a cam 670 on its periphery engages a roller carried by the latch and lifts the latter out of locking position, permitting the shaft 664 to be retracted by means of a spring 671. The swinging movement of the pin 662 is controlled by a cam 672 also secured to the shaft 642. Keyed to the shaft 664 is an arm 673 carrying a cam engaging roller in the path of the cam 672. As the shaft 642 is rotated said cam operates the arm 673 in opposition to a spring 674 and swings the pin 662 upward into operative position as shown in Fig. 97. During the return movement of the shaft 642, a roller 675 engages a cam groove 676 and holds the bending pin in position.

The operation of the bending mechanism just described may be understood from the description above given, but will be briefly stated as follows: The rod 638 is operated to swing the mechanism to a vertical position to receive the coil 62 which is transferred from the winding chuck onto the pins a', b'. With the coil on these pins the rack bar 632 is moved upward to rotate the pinions 640 and the gear wheels 641. The bending frames w are thereby swung from their depending position, Figs. 94 and 98, into a horizontal position as shown in Fig. 97. The coil 62 is thus stretched into a straight line. During this swinging movement of the bending frames, the cam rollers 658 are guided along the cam arms 659 and the blocks 647, and the locking plates 654, 655 are thereby swung into locking position to hold the coil on the pins. As the bending frames approach this horizontal position, the bending pins 662 are swung upward and also projected by the cam devices shown in Figs. 99 and 100 as already described. During the return movement of the bending frames w, the bending pins 662 are held in the operative position to form the inner bends of the coil, so that the latter is shaped as indicated by dotted lines in Fig. 98. The bending pins 662 are now released and assume their inoperative position. Locking plates 654, 655 have also been retracted during the return movement of the bending frames, so that the coil is free to be removed by the mechanism heretofore set forth.

It will be understood that the principles of my invention may be embodied in various structures specifically different from those herein disclosed and my invention apprehends such modifications as come within the scope of the appended claims.

What I claim is:

1. In a coil making machine, the combination of mechanism to wind a coil, and means automatically to stretch the coil into substantially a straight loop, and bend the loop.

2. In a coil making machine, the combination of mechanism for winding material into a circular coil, and mechanism to stretch the coil into a straight loop, and bend the end portions into position each to extend at an angle to the central portion of the loop.

3. In an armature coil making machine, the combination of mechanism to wind material into a coil, and automatic means to apply separate binding material to the coil.

4. In an armature coil making machine, the combination of means to wind a coil or ring from strand material, and mechanism coöperating therewith automatically to secure separate binding material to the coil.

5. The combination of mechanism to form a coil, and means associated with said mechanism to automatically apply binding clips to the coil.

6. The combination of means to wind strand material into a coil, and mechanism associated with said coil-winding means automatically to apply binding clips to the coil and clamp them in position on the coil.

7. In a coil making machine, the combination of mechanism to wind material into a coil, means automatically to apply binding clips at equal intervals around the coil, and means to clamp said clips in position on the coil.

8. In a coil making machine, the combination of mechanism to wind material into a coil, means to apply binding clips to the coil, and mechanism to eject the coil.

9. In a coil making machine, the combination of mechanism to wind a coil, coil bending mechanism, and means to automatically transfer the coil from the winding mechanism to the bending mechanism.

10. In a coil making machine, the combination of a coil winding device, means to apply binding clips to the coil, coil bending mechanism, and means automatically to transfer the coil from the winding device to the bending mechanism.

11. In a coil making machine, the combination of mechanism to wind material into a coil, mechanism to bind the coil, mechanism to bend the coil, and means to effect the automatic coöperation of said mechanisms.

12. In a coil making machine, the combination of a flanged disk, guides forming with said disk an annular guide way to receive the winding material, and mechanism for retracting said guides into position to permit the removal of a coil.

13. In a coil making machine, the combination of a winding chuck formed to receive open coil binding clips, mechanism to wind a coil on said chuck and open clips, and means coöperating with the winding chuck to automatically close said clips on the coil.

14. In a coil making machine, the combination of a winding chuck formed to receive open clips, means to rotate said chuck and wind the coil in said clips, radial clip-closing devices carried by the winding chuck, and means to operate said devices and clamp the clips on the coil.

15. In a coil making machine, the combination of a winding form adapted to receive coil clamping clips, means to wind a coil on said form, radially movable clip-closing plungers, and means to operate the latter and close the clips on the coil.

16. In combination, a winding chuck formed to receive binding clips, means to rotate said chuck and wind the coil on the clips, clip-closing plungers carried by the chuck, and means operable during the final winding rotation to close said clips on the coil.

17. In a coil making machine, the combination of a winding chuck, means to rotate said chuck, clip-closing devices carried by the chuck, a cam, and means for automatically moving said cam into position to operate said clip-closing means at a predetermined point in the operation of the winding chuck.

18. The combination of a coil winding device, means for automatically rotating said device a predetermined number of times in forming a coil, radially disposed and radially movable clip-closing devices carried by the winding device, and means automatically operable into position to operate said clip-closing devices during the final rotation of the winding device.

19. The combination in a coil making machine, of a winding chuck, guide plates carried by the chuck and radially movable into and out of position to prevent removal of a coil from the winding chuck, radially movable clip-closing plungers, a cam member rotatable relatively to the winding chuck, and cams on said member for operating the said guide plates and clip-closing plungers.

20. In a coil making machine, the combination of a winding chuck, mechanism for opening the latter when a coil has been wound, an ejecting device, and means for operating the latter automatically to eject a coil from the winding chuck.

21. In a coil making machine, the combination of a winding chuck, means for operating the chuck to wind a coil, mechanism for applying binding clips to the coil, an ejecting device comprising ejecting pins movable into position to engage the binding clips, and means for operating the ejecting device.

22. The combination of a coil winding device, means for severing the winding material after the coil is wound, a gripping device in the path of said material and operable thereby to automatically grip the material and hold it as a new coil is being wound.

23. In a coil making machine, the combination of a winding device, means to rotate said device and wind wire or other material into a coil, clamping means carried by the winding device and operable by the tension of the winding material to clamp the latter, and means to sever said material between the wound coil and said clamping means after the latter has operated.

24. In a coil making machine, the combination of a coil winding device, means for guiding winding material to said device, and means for placing binding clips on said material and causing them to be carried with said material to the winding chuck.

25. In a coil making machine, the combination of a winding chuck, means for guiding strand material thereto, means for placing binding clips on said material to be conveyed thereby to the winding chuck, and means for operating the latter to wind a coil of said material in the binding clips.

26. In a machine for making armature coils, the combination of winding mechanism, means to feed winding material and separate binding material to said mechanism, means to operate the winding mechanism and form a coil, and means to secure the binding material to the coil.

27. In a coil making machine, the combination of a coil winding device, means to guide winding material to said device, and means to place binding devices on said material before it reaches the coil winding device.

28. In a coil making machine, the combination of a winding device, mechanism to guide the coil forming material in a loop as it is fed to the winding device, and means to apply binding clips to the winding material while in the loop.

29. In a coil making machine, the combination of a coil winding mechanism, a rotatable member over which the coil forming material is guided, and means for applying clips to said rotatable member and permitting them to be carried with the winding material from said rotatable member to the winding mechanism.

30. In a coil making machine, the combination of a winding chuck, a rotary clip holding device, means to guide winding material over said device, mechanism for placing the clips on said device, and means for releasing the clips therefrom and permitting them to be carried with the winding material to the winding chuck.

31. In a coil making machine, the combination of a rotary disk, clamping plates on opposite sides of said disk, means for guiding coil forming material onto said disk and rotating the latter, and means to place binding clips on said disk in position to be held by said clamping plates.

32. In a coil making machine, the combination of a winding chuck, a frame, rotary members carried by said frame and adapted to guide winding material in a loop as it passes to the winding chuck, and means to apply binding clips to said loop.

33. In a machine for making coils, the combination of a coil winding chuck, a frame comprising rotary members over which the coil forming material extends in a loop, means to apply binding clips to the loop, and means to guide the winding material in position to hold the binding clips as they are carried to the winding chuck.

34. In a coil making machine, the combination of a winding chuck, means for applying binding clips to the material as it is fed to the winding chuck, and means to direct said material and cause it to hold said clips and carry them to the winding chuck.

35. In a coil making machine, the combination with winding mechanism, of mechanism to guide the winding material in a loop during its passage to the winding mechanism, apparatus for applying clips to the material while in the loop, and means to hold said loop in such position that the incoming winding material will engage the outer faces of the clips and hold the latter against displacement as the clips are carried to the winding mechanism.

36. In a coil making machine, the combination of a coil winding chuck, means for guiding winding material to the chuck, mechanism for placing binding clips on said material and causing them to be carried thereby to the winding chuck, and equally spaced around the chuck during the first rotation thereof, and means for clamping said clips to the coil after the latter has been wound.

37. In coil making apparatus, the combination of mechanism for winding a coil, and pneumatically operable mechanism to supply a predetermined number of binding clips to the coil winding mechanism.

38. In coil making apparatus, the combination of a coil winding device, clip forming mechanism, a spiral feed device, pawl and ratchet mechanism for feeding the clips from the clip forming mechanism to said spiral feed device with a step-by-step motion, and means for conveying the clips from the spiral device to the winding mechanism.

39. In a coil making machine, the combination of a spiral clip feeding device, winding mechanism, means for guiding coil forming material to the winding mechanism, and mechanism for transferring binding clips from said spiral feeding device to said material.

40. In a coil making machine, the combination of coil winding mechanism, a spiral clip feeding device, a clip holding member, means for transferring clips from the spiral to said holding member, and means for guiding winding material over said holding member and causing said material to carry the clips to the winding mechanism.

41. In a coil making machine, the combination of winding mechanism, a spiral clip feeding device, a guide, means to carry the clips off said feeding device and onto the guide, and mechanism for transferring the clips from said guide to the winding mechanism.

42. In a coil making machine, the combination of a spiral clip feeding device, a guide, means to transfer clips from said device to the guide, a clip carrier, a reciprocating arm adapted to engage the clips on the guide and transfer them from said guide to the carrier, and means for operating the carrier to transfer the clips to the winding material.

43. In a coil making machine, the combination of coil winding mechanism, a rotary shaft formed with a spiral or helical groove having its final convolution normal to the axis of the shaft, means for supplying clips to the spiral, and mechanism transferring the clips from the spiral to the winding material.

44. In a coil making machine, the combination of coil winding mechanism, a rotary shaft formed with a spiral groove terminating in a convolution in a plane perpendicular to the axis of the shaft, a guide arm, means carried by the shaft for transferring binding clips from said convolution onto said guide arm, and means for transferring the clips from said guide arm to the coil winding mechanism.

45. In coil making apparatus, the combination of a coil winding device, a rotary clip holding device, a spiral clip feed, a guide arm, means to transfer binding clips from said spiral feed to the guide arm, a reciprocating member operable to carry the clips along said guide arm, a reciprocating clip holder in position to receive the clips from said arm and transfer them to said rotary clip holding device, and means for guiding winding material over said rotary device and from thence to the winding mechanism.

46. In a coil making machine, the combination of a coil winding chuck, a bending form, mechanism to transfer a coil from the winding chuck to the bending form, and means for operating the latter to modify the form of the coil.

47. In a machine for making coils, the combination of a coil winding chuck, means for guiding winding material onto the chuck, holding devices carried by the chuck and movable into and out of position to prevent the removal of a coil from the chuck, clip forming mechanism, means to carry the clips and place them on the chuck in position to receive the winding material as it is formed into a coil, coil bending mechanism, means to retract said holding devices, ejecting mechanism operable to transfer the coil from the winding chuck onto the bending mechanism, a motor, gearing between said motor and the bending mechanism, means for automatically removing the finished coil from the bending mechanism, and means for automatically effecting the coöperation of the several parts in a predetermined order.

48. In a coil making machine, the combination of a winding shaft, a cam shaft, cam devices carried by said cam shaft and operable to effect the several operations of the coil making mechanism in a predetermined order, and means to rotate said shafts alternately.

49. In a coil making machine, the combination of a winding shaft, a cam shaft, gearing for operating said shafts intermittently, mechanism to vary the relative number of rotations of said shafts, a winding chuck carried by the winding shaft, clip forming mechanism, means to apply the clips to the coil, and mechanism controlled by the cam shaft for effecting the several steps in the formation of the coil.

50. In a coil making machine, the combination of a winding shaft, a cam shaft, and means for driving said shafts in alternation.

51. In a coil making machine, the combination of a winding shaft, a cam shaft, means to drive said shafts alternately, and means to vary the relative number of rotations of said shafts.

52. In a coil making machine, the combination of a winding shaft, a coil winding chuck carried thereby, a cam shaft, gearing connecting said cam shaft and winding shaft, means for rotating the cam shaft and thereby driving the winding shaft, means for rotating the winding shaft independently of the cam shaft, and means associated with the cam shaft for controlling the coil making operations.

53. In a coil making machine, the combination of a winding chuck, means for imparting a slow rotation to the winding chuck, means for applying binding clips and a convolution of winding material to the chuck during such slow rotation, and mechanism for automatically rotating the chuck at a higher speed during the continued winding operation.

54. In a coil making machine, the combination of a coil winding chuck, means to impart an initial slow rotation to the winding chuck, automatic mechanism to increase the speed after said initial rotation, means to automatically stop the winding chuck after a predetermined number of rotations, and adjusting mechanism to effect any desired number of rotations.

55. In a coil making machine, the combination of a winding shaft, a segmental gear pinion carried thereby, a segmental gear comprising a toothed portion adapted to mesh with said gear pinion and a locking portion adapted to interlock with said pinion, means to drive said gear, means to drive the winding shaft independently of said gear, and means to automatically engage said pinion and gear after a predetermined number of rotations of the winding shaft.

56. In a coil making machine, the combination of a winding shaft, a drive shaft, an intermediate shaft, gearing connecting the drive shaft and said intermediate shaft, gearing connecting the intermediate shaft and the winding shaft, separate gearing between the winding shaft and the drive shaft, mechanism for automatically disconnecting the drive shaft and said intermediate shaft after the latter has made one rotation, segmental gears carried by the drive shaft and intermediate shaft and adapted to intermesh, said segmental gears being formed to permit independent rotation while in a predetermined relative position, and means automatically to cause said segmental gears to intermesh when the winding shaft has made a predetermined number of rotations independently of the intermediate shaft.

57. In a coil making machine, the combination of a drive shaft, coil winding mechanism comprising a winding shaft, gearing forming a drive connection between said shafts, means automatically to disconnect said shafts after a predetermined number of rotations of the winding shaft, an adjusting device to vary the number of rotations, and an index indicating the number of rotations for which the adjusting device is set.

58. In a coil making machine, the combination of a winding shaft, mechanism for driving said shaft, means to automatically disengage said shaft from the driving mechanism, a device controlling said disengaging means, Geneva-gearing driven by the winding shaft to operate said device, and adjusting mechanism to adjust said device and thereby vary the number of rotations of the winding shaft.

59. In a coil making machine, the combination of a winding shaft, a drive shaft, gearing connecting said shafts and adapted to impart a slow rotation to the winding shaft, an adjusting shaft, means to rotate said adjusting shaft in one direction during the said slow rotation, gearing for imparting a fast rotation to the winding shaft, Geneva-gearing to rotate said adjusting shaft in the reverse direction, and means carried by said adjusting shaft for automatically disconnecting the winding shaft from the drive shaft after a predetermined number of rotations of the winding shaft.

In testimony whereof, I have signed my name to this specification in the presence of two subscribing witnesses.

WILLIAM DEATS.

Witnesses:
J. F. RULE,
J. G. BETHELL.